United States Patent
Kebrle et al.

(10) Patent No.: US 8,640,984 B2
(45) Date of Patent: Feb. 4, 2014

(54) COUNTER-TORQUE DEVICE FOR A HELICOPTER

(75) Inventors: John M. Kebrle, Dallas, TX (US);
James R. Andrews, Mansfield, TX (US);
Justin Daw, Fort Worth, TX (US); Jim Hurdle, Fort Worth, TX (US); Paul Sherrill, Grapevine, TX (US); Jimmy C. Narramore, Bedford, TX (US); Sidney Xue, Colleyville, TX (US); Charles Hollimon, Forth Worth, TX (US); Dudley Smith, Arlington, TX (US); Bryce Docker, Arlington, TX (US); John T. Brieger, Colleyville, TX (US)

(73) Assignee: Bell Helicopter Textron Inc., Hurst, TX (US)

(*) Notice: Subject to any disclaimer, the term of this patent is extended or adjusted under 35 U.S.C. 154(b) by 0 days.

(21) Appl. No.: 13/568,262

(22) Filed: Aug. 7, 2012

(65) Prior Publication Data
US 2013/0032664 A1 Feb. 7, 2013

Related U.S. Application Data

(62) Division of application No. 11/632,421, filed as application No. PCT/US2005/025283 on Jul. 15, 2005, now Pat. No. 8,286,908.

(60) Provisional application No. 60/588,366, filed on Jul. 16, 2004, provisional application No. 60/588,367, filed on Jul. 16, 2004, provisional application No. 60/588,375, filed on Jul. 16, 2004, provisional application No. 60/588,376, filed on Jul. 16, 2004, provisional application No. 60/588,377, filed on Jul. 16, 2004.

(51) Int. Cl.
*B64C 27/82* (2006.01)

(52) U.S. Cl.
USPC .................................. 244/17.19; 416/203

(58) Field of Classification Search
USPC ............. 244/17.19; 415/195, 119; 416/203
See application file for complete search history.

(56) References Cited

U.S. PATENT DOCUMENTS

| | | | |
|---|---|---|---|
| 3,285,502 A | 11/1966 | Wooden | |
| 4,492,518 A * | 1/1985 | Neal | 415/142 |
| 4,883,240 A | 11/1989 | Adamson | |
| 5,000,660 A | 3/1991 | Van Houten et al. | |

(Continued)

OTHER PUBLICATIONS

International Search Report issued in PCT/US2005/025283, dated Feb. 12, 2007, 4 pages.

(Continued)

*Primary Examiner* — Tien Dinh
*Assistant Examiner* — Michael Kreiner
(74) *Attorney, Agent, or Firm* — Pillsbury Winthrop Shaw Pittman LLP

(57) ABSTRACT

A ducted fan for a helicopter includes a transverse duct and a counter-torque device supported within the duct. The counter-torque device includes a rotor rotatably mounted within the duct and a stator fixedly mounted within the duct downstream from the rotor. The rotor includes a rotor hub having a rotor axis, and rotor blades extending from the hub. The Rotor blades have a modulated angular distribution about the rotor axis. The stator includes a stator hub, and a plurality of stator vanes distributed around the stator hub. The stator vanes are angularly modulated around the stator hub.

14 Claims, 33 Drawing Sheets

(56) References Cited

U.S. PATENT DOCUMENTS

| | | |
|---|---|---|
| 5,306,119 A | 4/1994 | Bandoh et al. |
| 5,342,167 A * | 8/1994 | Rosseau ............... 415/119 |
| 5,454,691 A | 10/1995 | Henri et al. |
| 5,498,129 A | 3/1996 | Dequin et al. |
| 5,566,907 A * | 10/1996 | Marze et al. ............ 244/17.19 |
| 5,588,618 A | 12/1996 | Marze |
| 5,634,611 A | 6/1997 | Marze et al. |
| 6,182,787 B1 | 2/2001 | Kraft |
| 6,439,838 B1 * | 8/2002 | Crall et al. ............... 415/119 |
| 6,755,280 B2 | 6/2004 | Porte |

OTHER PUBLICATIONS

Written Opinion of the International Search Authority in PCT/US2005/025283, dated Feb. 12, 2007, 5 pages.

D. Ewald, et al., "Noise Reduction by Applying Modulation Principles," The Journal of the Acoustical Society of America, XP008096642, p. 1381-1385, (Nov. 23, 1970).

* cited by examiner

| BLADE NUMBER | NOMINAL (DEGREES) | SINUSOIDAL LAW (m=2) (DEGREES) | BELL MODIFIED SINUSOIDAL LAW (m=1) (DEGREES) |
|---|---|---|---|
| 1 | 40.00 | 49.400 | 44.76 |
| 2 | 40.00 | 33.865 | 40.68 |
| 3 | 40.00 | 28.464 | 41.57 |
| 4 | 40.00 | 42.136 | 34.80 |
| 5 | 40.00 | 52.270 | 33.00 |
| 6 | 40.00 | 42.136 | 58.37 |
| 7 | 40.00 | 28.464 | 30.75 |
| 8 | 40.00 | 33.865 | 37.15 |
| 9 | 40.00 | 49.400 | 38.92 |

FIG. 7

COMPS FOR VARIANT MODULATION    56

| No-B | B-No | Def-Angle | m=1 | dTheta | Phi-mod | Σsin=0? | Σcos=0? | Σ^2 | Spacing | MinSp |
|------|------|-----------|-----|--------|---------|---------|---------|-----|---------|-------|
| 9    | 1    | 0         | 1   | 9.4444 | 0       | 0       | 1       |     | 42.34694 | 10   |
|      | 2    | 40        | 1   | 3.1498 | 42.3469 | 0.6736  | 0.73908 |     | 31.23676 |      |
|      | 3    | 80        | 1   | 6.4558 | 73.5837 | 0.9592  | 0.28261 |     | 53.01519 |      |
|      | 4    | 120       | 1   | 11.365 | 126.599 | 0.8028  | -0.5962 |     | 35.59295 |      |
|      | 5    | 160       | 1   | 9.989  | 162.192 | 0.3058  | -0.9521 |     | 29.05042 |      |
|      | 6    | 200       | 1   | 10.028 | 191.242 | -0.195  | -0.9808 |     | 53.61861 |      |
|      | 7    | 240       | 1   | 5.1414 | 244.861 | -0.9053 | -0.4248 |     | 35.95582 |      |
|      | 8    | 280       | 1   | -2.106 | 280.817 | -0.9822 | 0.18767 |     | 39.10491 |      |
|      | 9    | 320       | 1   | 0.1831 | 319.922 | -0.6438 | 0.76516 |     | 40.07841 |      |
|      |      |           |     |        |         | 0.0152  | 0.0206  | 7E-04 |       |      |

FIG. 9

SCIMITAR BLADE GEOMETRIC DEFINITIONS

| STATION (INCHES) | TWIST (DEGREES) | CHORD (INCHES) | c/4 OFF-SET (INCHES) | c/4 SWEEP ANGLE (DEGREES) | t/c | r/R |
|---|---|---|---|---|---|---|
| 9.000 | 0.000 | 2.650 | -0.410 | -14.803 | 0.19867 | 0.450 |
| 11.000 | -3.240 | 2.955 | -0.823 | -8.472 | 0.15821 | 0.550 |
| 12.000 | -4.651 | 3.042 | -0.943 | -5.216 | 0.14402 | 0.600 |
| 13.475 | -6.355 | 3.090 | -1.015 | -0.357 | 0.12773 | 0.674 |
| 15.000 | -7.556 | 3.039 | -0.958 | 4.670 | 0.11510 | 0.750 |
| 16.000 | -8.009 | 2.950 | -0.847 | 7.933 | 0.10859 | 0.800 |
| 17.210 | -8.200 | 2.784 | -0.636 | 11.811 | 0.10228 | 0.861 |
| 18.000 | -8.122 | 2.640 | -0.453 | 14.287 | 0.09902 | 0.900 |
| 19.000 | -7.813 | 2.419 | -0.170 | 17.345 | 0.09589 | 0.950 |
| 20.000 | -7.300 | 2.155 | 0.171 | 20.304 | 0.09400 | 1.000 |

COUNTER-TORQUE DEVICE FOR A HELICOPTER

This is the Divisional Application of U.S. patent application Ser. No.: 11/632,421, filed Jun. 23, 2008, which is a U.S. National Phase of PCT/US2005/025283, filed Jul. 15, 2005, which in turn claims priority to U.S. Provisional Application Nos. 60/588,366, 60/588,367, 60,588,375, 60/588,376, and 60/588,377, all filed Jul. 16, 2004, the entire contents of all applications being hereby incorporated by reference.

BACKGROUND OF THE INVENTION

1. Field of the Invention

The present invention relates to a counter-torque device of a helicopter.

2. Background

Nonuniform spacing of fan blades to provide reduced noise levels and the redistribution of the frequencies at which there is noise energy so as to generate fewer perceptible sounds is disclosed in "Noise Reduction by Applying Modulation Principles," by Donald Ewald et al., published in the Journal of the Acoustical Society of America, Vol. 49, No. 5 (Part I), 1971, pp. 1381-1385, the entire disclosure of which is incorporated herein by reference thereto. The Ewald et al. article states the following with respect to the modulated positions between fan blades:

Modulated positions between fan blades are determined by the sinusoidal equation $\theta_i'=\theta_i+\Delta\theta \sin(m\theta_i)$, where $\theta_i$ is the ith blade position Modulated positions are described by:

$$\theta_i'=\theta_i+\Delta\theta \sin(m\theta_i), \quad (1)$$

where $\theta_i$ is the ith blade position in an evenly spaced fan arrangement, $\theta_i'$ is the ith blade position after rearranging the blades, $\Delta\theta$ is some maximum blade-angle change (the modulation amplitude), and m is the number of times the modulation cycle is repeated in one revolution of the fan . . . .

The noise resulting from sinusoidal modulation of the fundamental blade passing tone may be expressed by the classical sinusoidal phase-modulation equation $$F(t)=A_0 \sin(2\pi F_0 t+\Delta\phi \sin 2\pi vt), \quad (3)$$

where $A_0$ is amplitude of the fundamental blade passing tone; $F_0=If_2$, blade passing frequency; I, number of blades; $f_2$, shaft rotational frequency; $v=mf_s$, the modulation frequency; and $\Delta\phi=I\Delta\theta$, phase-modulation amplitude.

$\Delta\phi$ refers to an angle which goes from zero to $2\pi$ throughout each nominal blade spacing, and $\Delta\theta$ is an angle which goes from zero to $2\pi$ for each revolution of the shaft. This means that $\Delta\phi$ will go from zero to $2\pi I$ times for every time that $\Delta\theta$ goes from zero to $2\pi$ . . . .

By using the trigonometric relations $$\sin p \cos q = 1/2[\sin(p+q)+\sin(p-q)],$$

$$\sin(p+q)=\sin p+\cos q)+\cos p \sin q$$

and the relations between the Bessel and trigonometric functions $$\cos(p \sin q) = J_0(p) + 2\sum_{n=1}^{\infty}[J_{2n}(p)\cos(2nq)],$$

$$\sin(p \sin q) = 2\sum_{n=1}^{\infty}[J_{2n-1}(p)\sin(2n-1)q],$$

where $J_n(p)$ is the Bessel function of the first kind, order n, argument p, it can be shown that $$f(t) = A_0\{J_0(>\phi)\sin(2\pi F_0 t) + \sum_{n=1}^{\infty} J_n(\Delta\phi)\sin[2\pi(F_0+nv)t] + \sum_{n=1}^{\infty}(-1)^n J_n(\Delta\phi)\sin[2\pi(F_0+nv)t]\}. \quad (4)$$

Equation 4 illustrates that the frequency spectrum will consist of a center frequency at $F_0$ with an amplitude of $A_0 J_0(\Delta\phi)$ and a number of side bands at integer multiples of v from the center frequency, with amplitudes symmetric about the center frequency.

The values of $J_n(\Delta\phi)$ may be found in many mathematical handbooks and are shown graphically in FIG. 2(a) [which is FIG. 8(a) in the subject application].

An example of how the frequency spectrum may be determined for a given $\Delta\phi$ is shown in FIG. 2 [FIG. 8(b) in the subject application]. A trial value is chosen for $\Delta\phi$. Then a vertical line is drawn through the trial value of $\Delta\phi$. The intersection of this line with the $J_n(\Delta\phi)$ curves indicates the relative amplitudes of the resulting components at frequencies $F_0\pm nv$. The resulting frequency spectrum, FIG. 2(b) [which is FIG. 8(b) in the subject application] is given to the right of the graph. Note that absolute values are plotted on the frequency spectrum shown in FIG. 2(b). The dashed lines in FIG. 2(b) indicate the normalized amplitude of the fundamental blade passing frequency tone for a fan with evenly spaced blades . . . .

The Bessel series is for a continuous phase-modulated function, while the actual frequency spectrum of the fan is produced by a number of more nearly discrete events. The amplitudes in the frequency spectrum obtained from the Bessel series will therefore differ somewhat from those obtained from the fan. The Bessel series, however, will more closely approximate the actual fan spectrum when the number of blades is large.

In order to increase acoustic performance, it is known to have the blades of a rotor that rotates in a transverse duct have an angular distribution according to an uneven azimuth modulation given by the known sinusoidal law $\theta_n=n\times 360°/b+\Delta\theta \sin(m\times n\times 360°/b)$ where $\theta_n$ is the angular position of the nth of the blades counted in series from an arbitrary origin, b is the number of blades, m is modulation factor being a whole number chosen from 1 to 4, which is not prime with the number b of blades, chosen from 6 to 12, and $\Delta\theta$ is a constant chosen to be greater than or equal to a minimum value $\Delta\theta_{min}$, which is such that the product $\Delta\theta_{min}$ times b is chosen within a range of values extending from 1.5 radian to 1 radian, such as set forth in U.S. Pat. No. 5,566,907 to Marze et al., the entire disclosure of which is incorporated herein by reference thereto. However, such a method does not result in a balanced rotor wherein modulation factor m is selected to be prime with the number of blades, including where modulation factor m=1.

Additionally, in both the Ewald et al. article and U.S. Pat. No. 5,566,907, $\Delta\theta$ is a constant. The methods of the prior art as disclosed in the above-mentioned Ewald et al. article and U.S. Pat. No. 5,566,907, with a constant $\Delta\theta$, do not result in a balanced rotor when modulation factor m=1 and do not result in a balanced rotor when modulation factor m=2 for an odd number of blades. Additionally, as seen in the Ewald et al. article, for any given $\Delta\phi$, at most two Bessel functions ($J_n$), as seen in FIG. 2 of the Ewald et al. article (FIG. 8(a) of the subject application), will have the same value. Thus, the fundamental harmonic (amplitude determined by $J_0$) and the harmonics on either side (determined by $J_1$) will have approximately the same amplitude for $\Delta\phi$, that is $\Delta\phi=1.5$, which is also consistent with U.S. Pat. No. 5,566,907.

SUMMARY OF THE INVENTION

One aspect of the invention relates to a ducted fan for a helicopter, comprising: a transverse duct; and a counter-torque device supported within the duct, the counter-torque device including a rotor rotatably mounted within the duct and a stator fixedly mounted within the duct downstream from the rotor, the rotor including: a rotor hub having a rotor axis, and rotor blades extending from the hub, the rotor blades having a modulated angular distribution about the rotor axis, the angular distribution being defined by the equation: $\theta_i'=\theta_i+\Delta\theta_i \sin(m\theta_i)$ where $\theta_i'$ is the modulated blade angle for the ith blade; $\theta_i$ is the nominal blade angle for the ith blade; $\Delta\theta_i$ is the maximum modulation amplitude for a specific blade, m is the modulation factor, and $\Delta\theta_i$ is not a constant for the rotor as a whole, and wherein the resulting rotor is substantially balanced, and the stator including: a stator hub, and a plurality of stator vanes distributed around the stator hub, wherein the stator vanes are angularly modulated around the hub such that the angular spacing between adjacent vanes of the stator vanes varies around the stator hub for each pair of the adjacent vanes.

Another aspect of the invention relates to a ducted fan for a helicopter, comprising: a transverse duct; and a counter-torque device supported within the duct, the counter-torque device including a rotor rotatably mounted within the duct and a stator fixedly mounted within the duct downstream from the rotor, the rotor including: a rotor hub having a rotor axis, and rotor blades extending from the hub, the rotor blades having a modulated angular distribution about the rotor axis, the angular distribution being defined by the equation: $\theta_i'=\theta_i+\Delta\theta_i \sin(m\theta_i)$ where $\theta_i'$ is the modulated blade angle for the ith blade; $\theta_i$ is the nominal blade angle for the ith blade; $\Delta\theta_i$ is the maximum modulation amplitude for a specific blade and is equal to $\Delta\phi/I$ where $\Delta\phi$ is phase-modulation amplitude and I is the number of blades, and m is the modulation factor that is not equal to a prime of the number of blades, and the stator including: a stator hub, and a plurality of stator vanes distributed around the stator hub, wherein the stator vanes are angularly modulated around the stator hub such that the angular spacing between adjacent vanes of the stator vanes varies around the stator hub for each pair of the adjacent vanes.

Another aspect of the invention relates to a ducted fan for a helicopter, comprising: a transverse duct; and a counter-torque device supported within the duct, the counter-torque device including a rotor rotatably mounted within the duct and a stator fixedly mounted within the duct downstream from the rotor, the rotor including: a rotor hub having a rotor axis, and rotor blades extending from the hub, the rotor blades having an un-modulated angular distribution about the rotor axis such that the angular spacing between adjacent blades is constant around the hub for all pairs of the adjacent blades, and the stator including: a stator hub, and a plurality of stator vanes distributed around the stator hub, wherein the stator vanes are angularly modulated around the stator hub such that the angular spacing between adjacent vanes of the stator vanes varies around the stator hub for each pair of the adjacent vanes.

Another aspect of the invention relates to a ducted tail fan for a helicopter, comprising: a duct; a counter-torque device supported within the duct, the counter-torque device including a rotor rotatably mounted within the duct and a stator fixedly mounted within the duct downstream from the rotor, the rotor including a hub and a plurality of blades distributed around the hub, wherein each of the blades has a substantially non-rectangular planform shape.

Another aspect of the invention relates to a helicopter assembly, comprising: a tail fan shroud having a tail fan duct extending completely through the shroud, the duct having a duct longitudinal axis extending transverse to a helicopter body longitudinal axis; a counter-torque device supported within the duct, the counter-torque device including a tail rotor rotatably mounted within the duct and a stator fixedly mounted within the duct downstream from the tail rotor, the counter-torque device countering the torque of a main rotor, the tail rotor including a hub and a plurality of blades distributed around the hub, wherein each of the blades has a substantially non-rectangular planform shape.

Another aspect of the invention relates to a rotor blade for a ducted tail fan of a helicopter, comprising: a leading edge; a trailing edge; a main portion extending between the leading and trailing edges; and a series of chord planes extending between the leading and trailing edges along the a respective chord and positioned along the length of the blade as located by stations along the longitudinal axis of the blade, wherein a desired chord plane twist (degrees) as a function of each the station location (inches) being defined by the equation: Twist (deg)=$-0.000447903*ST^4+0.0278569*ST^3-0.514872*ST^2+2.10206*ST+5.41711$, wherein a chord length (inches) as a function of station location (inches) is defined by the equation: Chord (in)=$-0.02197*ST^2+0.592025*ST-0.8989$, and wherein a quarter chord off-set (inches) that defines the sweep as a function of station location (inches) is defined by the equation: $\Delta c/4=0.02883*ST^2-0.7832*ST+4.714-0.41$.

Another aspect of the invention relates to a stator for a counter-torque device of a helicopter, the stator comprising: a hub; and a plurality of vanes distributed around the hub, wherein the vanes are angularly modulated around the hub.

Another aspect of the invention relates to a ducted fan for a helicopter, comprising: a transverse duct; and a counter-torque device supported within the duct, the counter-torque device including a rotor rotatably mounted within the duct and a stator fixedly mounted within the duct downstream from the rotor, the stator including a hub and a plurality of vanes distributed around the hub, wherein the vanes are angularly modulated around the hub.

Another aspect of the invention relates to a ducted fan for a helicopter comprising: a duct; a counter-torque device supported within the duct, the counter-torque device including a rotor rotatably mounted within the duct and a stator fixedly mounted within the duct downstream from the rotor, the stator including a hub, an annular support disk, and a plurality of vanes distributed about the hub and mounted between the hub and the support disk, wherein the vanes are angularly modulated around the hub.

Another aspect of the invention relates to a ducted fan for a helicopter comprising: a duct; and a counter-torque device supported within the duct, the counter-torque device including a rotor rotatably mounted within the duct and a stator fixedly mounted within the duct downstream from the rotor, the stator including a hub and a plurality of vanes distributed around the hub, wherein the vanes are angularly modulated around the hub and the modulated vanes are configured to be in tension when the rotor is operated.

Another aspect of the invention relates to a ducted fan for a helicopter, comprising: a duct; a counter-torque device supported within the duct, the counter-torque device including a rotor rotatably mounted within the duct and a stator fixedly mounted within the duct downstream from the rotor, the stator including a hub and a plurality of vanes distributed around the hub, wherein the vanes are angularly modulated around the hub and one of the vanes is modulated in a first direction and the remaining ones of the vanes are modulated in a second direction that is opposite to the first direction.

Another aspect of the invention relates to a rotor for a counter-torque device for a helicopter, comprising: a hub having a rotor axis; and blades extending from the hub, the blades having a modulated angular distribution about the rotor axis, the angular distribution being defined by the equation: $\theta_i'=\theta_i+\Delta\theta_i \sin(m\theta_i)$ where $\theta_i'$ is the modulated blade angle for the ith blade; $\theta_i$ is the nominal blade angle for the ith blade; $\Delta\theta_i$ is the maximum modulation amplitude for a specific blade of the blades, m is the modulation factor, and $\Delta\theta_i$ is not a constant for the rotor as a whole, and wherein the resulting rotor is substantially balanced.

Another aspect of the invention relates to a counter-torque device for a helicopter, comprising: a duct with a longitudinal axis; and a rotor secured within the duct for rotation within the duct about the longitudinal axis of the duct, the rotor having: a hub having a rotor axis; and blades extending from the hub, the blades having a modulated angular distribution about the rotor axis, the angular distribution being defined by the equation: $\theta_i'=\theta_i+\Delta\theta_i \sin(m\theta_i)$ where $\theta_i'$ is the modulated blade angle for the ith blade; $\theta_i$ is the nominal blade angle for the ith blade; $\Delta\theta_i$ is the maximum modulation amplitude for a specific blade of the blades, m is the modulation factor, and $\Delta\theta_i$ is not a constant for the rotor as a whole, and wherein the resulting rotor is substantially balanced.

Another aspect of the invention relates to a rotor for a counter-torque device for a helicopter, comprising: a hub having a rotor axis; and blades extending from the hub, the blades having an modulated angular distribution about the rotor axis, the angular distribution being defined by the equation: $\theta_i'=\theta_i+\Delta\theta_i \sin(m\theta_i)$ where $\theta_i'$ is the modulated blade angle for the ith blade; $\theta_i$ is the nominal blade angle for the ith blade; $\Delta\theta_i$ is the maximum modulation amplitude and is equal to $\Delta\phi/I$ where $\Delta\phi$ is phase-modulation amplitude for a given blade of the blades and I is the number of blades, and m is the modulation factor that is not equal to a prime of the number of blades.

Another aspect of the invention relates to a method for determining a substantially balanced, modulated angular spacing between blades of a tail rotor for a helicopter, comprising: selecting a modulation factor m; selecting a number of blades for attachment to a rotor; determining the modulated angular spacing between each of the rotors using a modified sinusoidal law wherein $\theta_i'=\theta_i+\Delta\theta_i \sin(m\theta_i)$ where $\theta_i'$ is the modulated blade angle for the ith blade; $\theta_i$ is the nominal blade angle for the ith blade; $\Delta\theta_i$ is the maximum modulation amplitude for a given blade of the blades, m is the modulation factor, and $\Delta\theta_i$ is not a constant for the rotor as a whole.

Another aspect of the invention relates to a ducted fan for a helicopter comprising: a duct having a longitudinal axis; a counter-torque device supported within the duct, the counter-torque device including a rotor rotatably mounted within the duct and rotatable in a rotor plane that is transverse to the longitudinal axis of the duct and operable to create a flow of air through the duct; and noise reducing resonators integrated into the duct and structured to reduce noise generated by the counter-torque device during operation of the rotor, wherein noise reducing resonators are positioned in the rotor plane.

Another aspect of the invention relates to a ducted fan for a helicopter comprising: a duct defining an annular inwardly facing duct surface; a counter-torque device supported within the duct, the counter-torque device including a rotor rotatably mounted within the duct and operable to create a flow of air through the duct; and a noise reducing layer of material attached to the duct surface and structured to reduce the noise generated by the counter-torque device during operation of the rotor.

Another aspect of the invention relates to a ducted fan for a helicopter comprising: a duct; a counter-torque device supported within the duct, the counter-torque device including a rotor rotatably mounted within the duct and operable to create a flow of air through the duct, the counter-torque device generating a noise during operation of the rotor; and means for reducing the noise generated by the counter-torque device during operation of the rotor, wherein the duct includes a rotor region that extends within a plane of the rotor, and the means is positioned in at least the rotor region of the duct and on the plane of the rotor.

Another aspect of the invention relates to a ducted fan for a helicopter comprising: a duct; a counter-torque device supported within the duct, the counter-torque device including a rotor rotatably mounted within the duct and operable to create a flow of air through the duct, the counter-torque device generating a noise during operation of the rotor; and means for reducing the noise generated by the counter-torque device during operation of the rotor, wherein the duct includes a rotor region that extends within a plane of the rotor, and the means is positioned at least in areas of the duct other than on the plane of the rotor.

Another aspect of the invention relates to a ducted fan for a helicopter comprising: a duct having a longitudinal axis; a counter-torque device supported within the duct, the counter-torque device including a rotor rotatably mounted within the duct and rotatable in a rotor plane that is transverse to the longitudinal axis of the duct and operable to create a flow of air through the duct; and noise reducing resonators integrated into the duct and structured to reduce noise generated by the counter-torque device during operation of the rotor, wherein noise reducing resonators are positioned in the rotor plane.

Another aspect of the invention relates to a ducted fan for a helicopter comprising: a duct defining an annular inwardly facing duct surface; a counter-torque device supported within the duct, the counter-torque device including a rotor rotatably mounted within the duct and operable to create a flow of air through the duct; and a noise reducing layer of material attached to the duct surface and structured to reduce the noise generated by the counter-torque device during operation of the rotor.

Another aspect of the invention relates to a ducted fan for a helicopter comprising: a duct; a counter-torque device supported within the duct, the counter-torque device including a rotor rotatably mounted within the duct and operable to create a flow of air through the duct, the counter-torque device generating a noise during operation of the rotor; and means for reducing the noise generated by the counter-torque device during operation of the rotor, wherein the duct includes a rotor region that extends within a plane of the rotor, and the means is positioned in at least the rotor region of the duct and on the plane of the rotor.

Another aspect of the invention relates to a ducted fan for a helicopter comprising: a duct; a counter-torque device supported within the duct, the counter-torque device including a rotor rotatably mounted within the duct and operable to create a flow of air through the duct, the counter-torque device generating a noise during operation of the rotor; and means for reducing the noise generated by the counter-torque device during operation of the rotor, wherein the duct includes a rotor region that extends within a plane of the rotor, and the means is positioned at least in areas of the duct other than on the plane of the rotor.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIG. 7 is a table containing the angular configuration of each blade of the rotor assembly configurations illustrated in FIGS. 5 and 6;

FIG. 9 shows values in determining modulated spacing for rotor blades for a rotor having nine blades in accordance with another embodiment of the invention;

DETAILED DESCRIPTION OF ILLUSTRATED EMBODIMENTS

Figure 1:
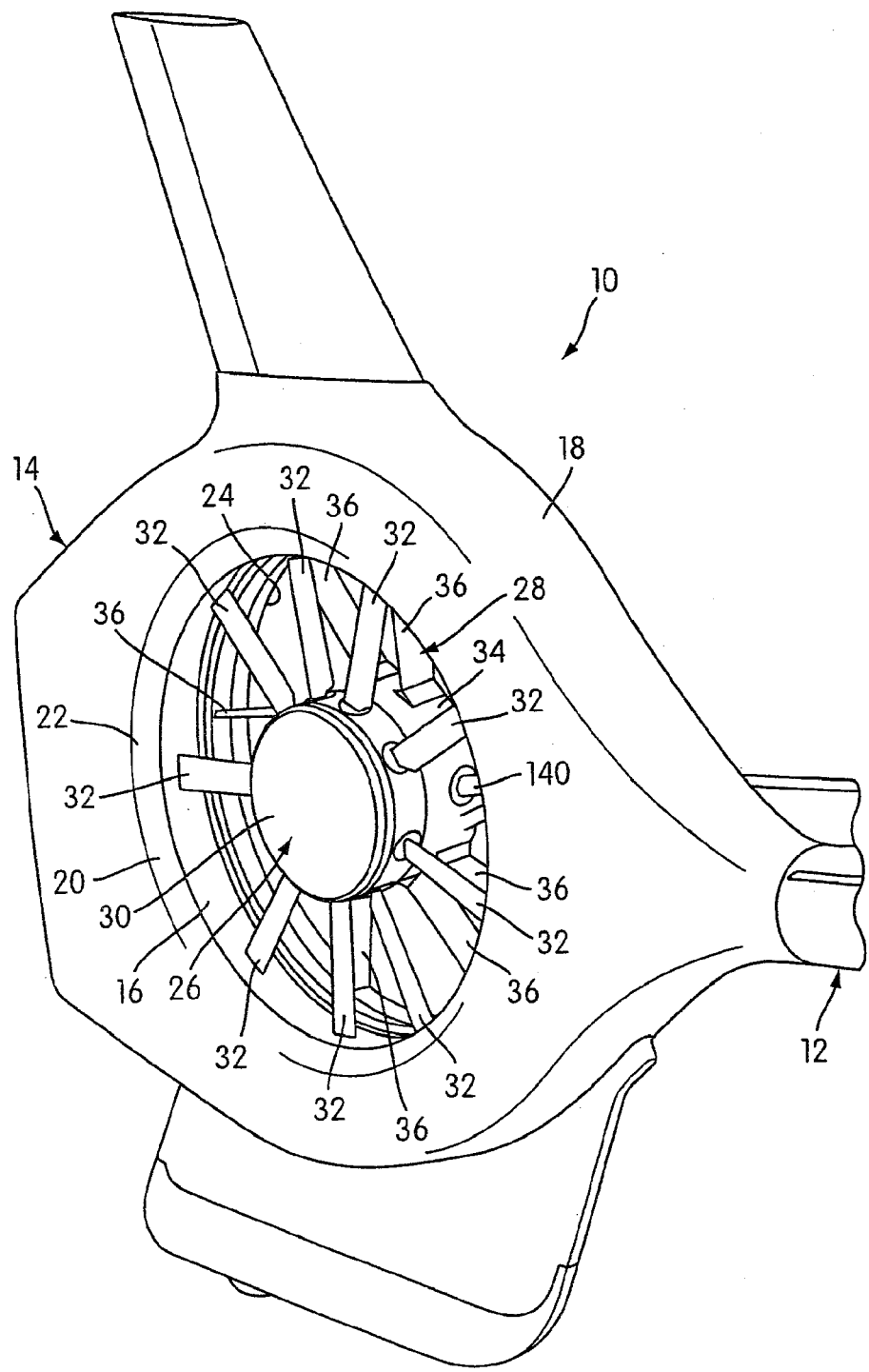
FIG. 1 is a perspective view illustrating an embodiment of a counter-torque device in a tail portion of a helicopter.
Figure 2:
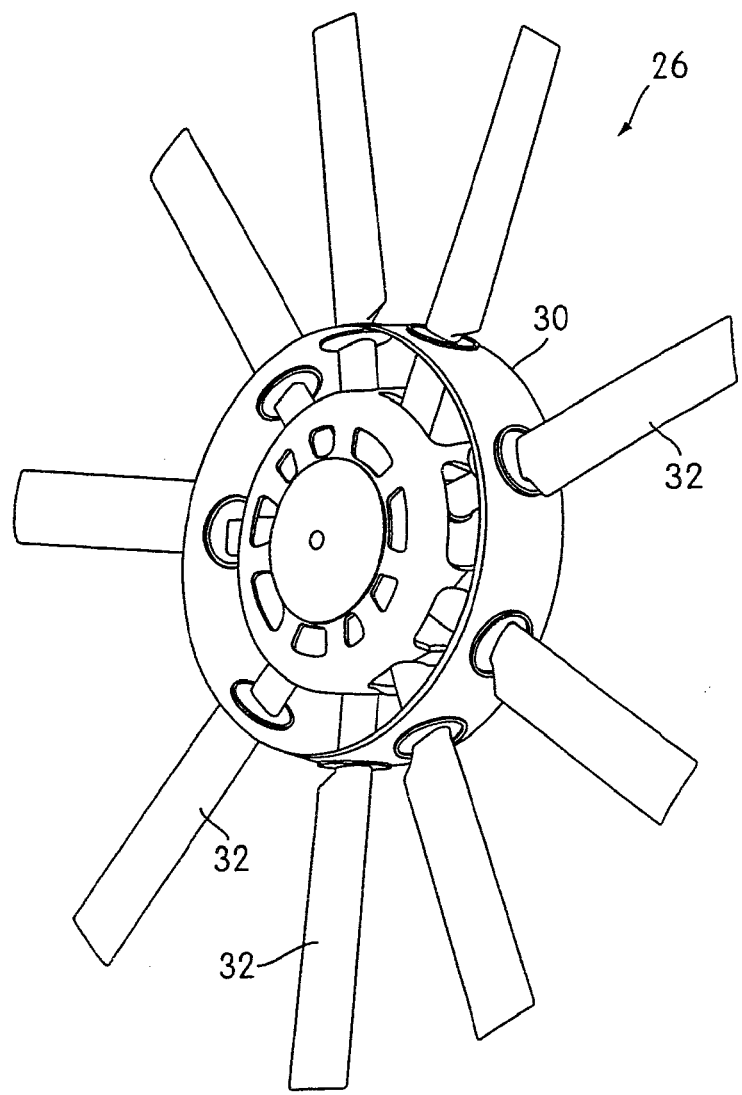
FIG. 2 is a rotor assembly of a tail fan as illustrated in FIG. 1.

FIG. 1 illustrates a tail portion 10 of a helicopter 12. The tail portion 10 includes a counter-torque device 14 that is structured to counter the torque created by rotation of the main rotor of the helicopter 12 for purposes of balancing the helicopter 12 in terms of yaw. The counter-torque device 14 is supported within a transverse duct 16 that extends through a shroud 18 of the tail portion 10. The ducted counter-torque device 14 is also referred to as a fenestron-type device.

In the illustrated embodiment, the duct 16 has a generally circular shape that defines an annular inwardly facing duct surface 20. The duct surface 20 includes a leading edge 22 where air is drawn in through the duct 16 by the counter-torque device 14, and a trailing edge 24 where air exits the duct 16.

As shown in FIG. 1, the counter-torque device 14 includes a rotor 26 and a stator 28 downstream of the rotor 26. The rotor 26 is rotatably mounted within the duct 16 and includes a hub 30 and plurality of blades 32 distributed around the hub 30. The rotor 26 may include any suitable number of blades 32, e.g., nine blades 32 as illustrated in the Figures. The rotor 26 is mounted for rotation about an axis that is substantially coaxial with the axis of the duct 16.

The stator 28 is fixedly mounted within the duct 16 and includes a hub 34 and a plurality of fixed vanes 36 distributed around the hub 34 that extend between the hub 34 and the duct surface 20. The stator 28 may include any suitable number of vanes 36, e.g., equal to or unequal to the number of rotor blades 32.

Figure 3:
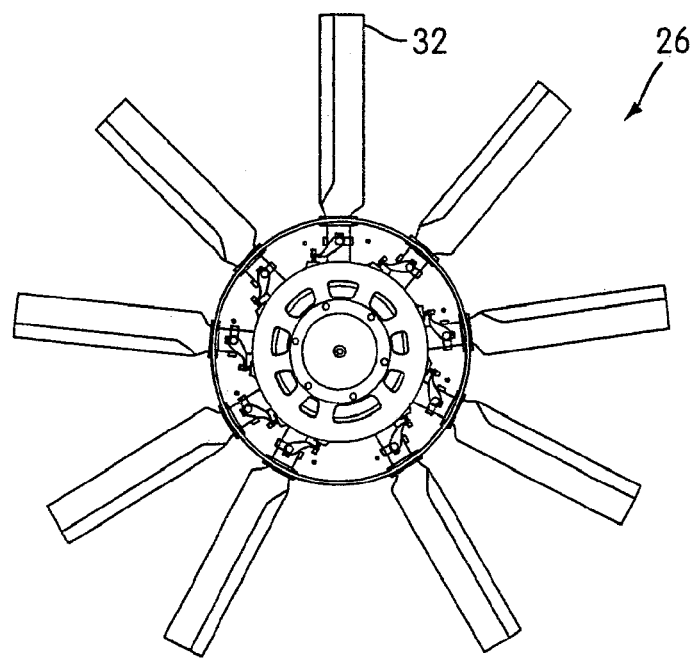
FIG. 3 is a rotor assembly similar to that shown in FIG. 1, in accordance with an embodiment of the invention wherein the modulation factor equals one.
Figure 4:
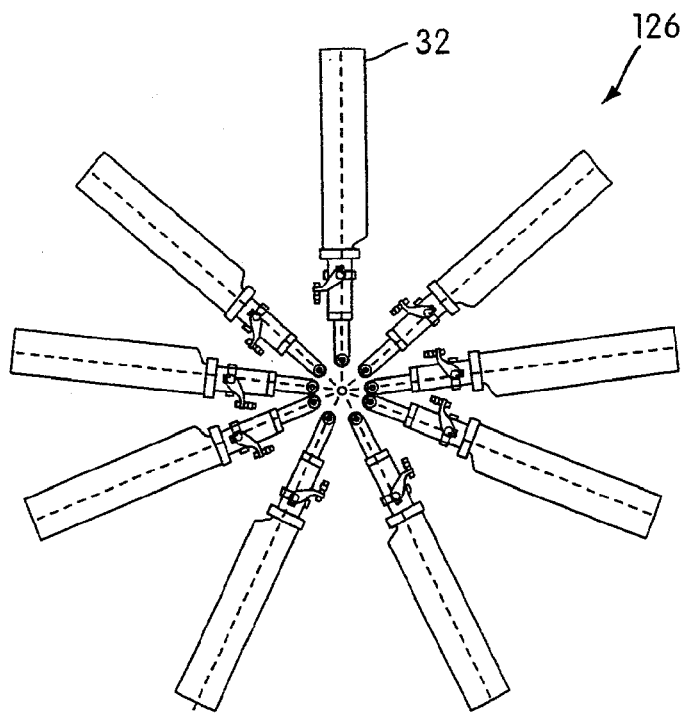
FIG. 4 is a rotor assembly similar to that shown in FIG. 1, in accordance with an embodiment of the invention wherein the modulation factor equals two.
Figure 5:
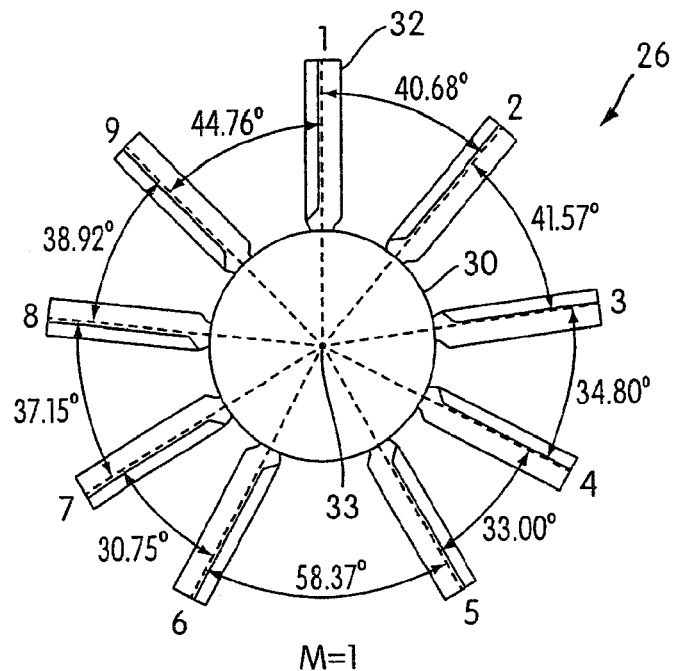
FIG. 5 is an illustration of a rotor assembly similar to FIG. 3 and illustrating the angular separation between rotor blades.
Figure 6:
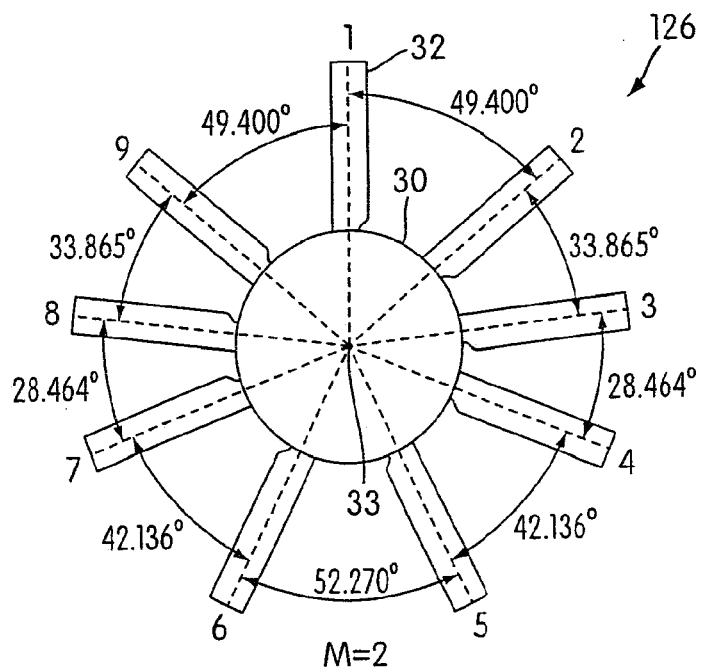
FIG. 6 is an illustration of a rotor assembly similar to FIG. 4 and illustrating the angular separation between rotor blades.

As seen in FIGS. 3-6, the rotor blades 32 are modulated around the rotational axis 33 of the rotor 26 such that the angles between adjacent rotor blades 32 are varied to create a balanced rotor 26 while decreasing noise. FIGS. 3 and 5 illustrate a rotor 26 with modulation factor m, as discussed below, of m=1, with FIG. 5 illustrating the optimized angle in degrees between each rotor blade 32. FIG. 7 provides a list of the angular spacing between each rotor blade 32 in FIGS. 3 and 5 under the column labeled "m=1." FIGS. 4 and 6 illustrate a rotor 126 with modulation factor m, as discussed below, of m=2, with FIG. 4 illustrating the optimized angle in degrees between each rotor blade 32. FIG. 7 provides a list of the angular spacing between each rotor blade 32 shown in FIGS. 4 and 6 under the column labeled "m=2."

The modulated rotor blade spacing reduces the amplitude of the fundamental frequency of the rotor and harmonics of that frequency, and shifts the energy to other frequencies normally not substantially present. These new tones that are generated tend to be masked by other noise sources and make the resulting sound more broadband, rather than tonal, in quality. Furthermore, the blade spacing method of the subject application can enable a dynamically balanced rotor to be developed without the modulation factor being a primed with respect to the number of blades. That is, the blade modulation factor and the number of blades can be such that the two numbers have no common divisor except unity. In other words, the blade modulation does not have to divide evenly into the number of blades. A lower modulation factor results in a more random, or broadband, sound. The use of a non-prime modulation factor can lead to blade spacing angles that are difficult to manufacture, so an optimization technique is used to slightly change the blade angles to that which can be manufactured while keeping the rotor system balance. Thus, the blade modulation reduces the amplitude of the fundamental tone of the rotor and increases the broadband randomness of the sound, while at the same time enables dynamic balancing of the rotor system.

An embodiment of the subject invention includes a method of achieving a balanced rotor with modulated rotor blades regardless of whether the modulation factor m is prime with the number of blades, and including when the modulation factor m is prime with the number of blades. Additionally, the method of the subject application permits the use of low modulation factors, such as modulation factor m=1 and modulation factor m=2, since a lower modulation factor m can result in a more random, or broadband sound.

For the embodiment of the subject invention, the angular spacing of the rotor blades 32 is determined by using the sinusoidal law:

$$\theta_i' = \theta_i + \Delta\theta_i \sin(m\theta_i)$$

where $\theta_i'$ is the modulated blade angle for the ith blade; $\theta_i$ is the nominal blade angle for the ith blade; $\Delta\theta_i$ is the maximum modulation amplitude or the maximum blade angle change; and m is the modulation factor (1, 2, 3, . . . , where 1=1 cycle of modulation from 0 to $2\pi$, 2=2 cycles of modulation from 0 to $2\pi$, etc.). Additionally, the subject embodiment utilizes the equation:

$$\Delta\theta_i = \Delta\phi/I$$

wherein I is number of blades.

Further, $\Delta\theta_i$ and, thus, $\Delta\phi$ are not constant in the sinusoidal law used in the subject embodiment. In the subject embodiment the disclosed method is utilized for balancing a modulated rotor with a modulation factor m that is prime with the number of blades of the rotor. That is, one embodiment of the subject invention includes balancing a nine-rotor blade with a modulation factor m of m=1. Another embodiment of the subject invention includes balancing a nine-rotor blade with a modulation factor m of m=2.

Figure 8:
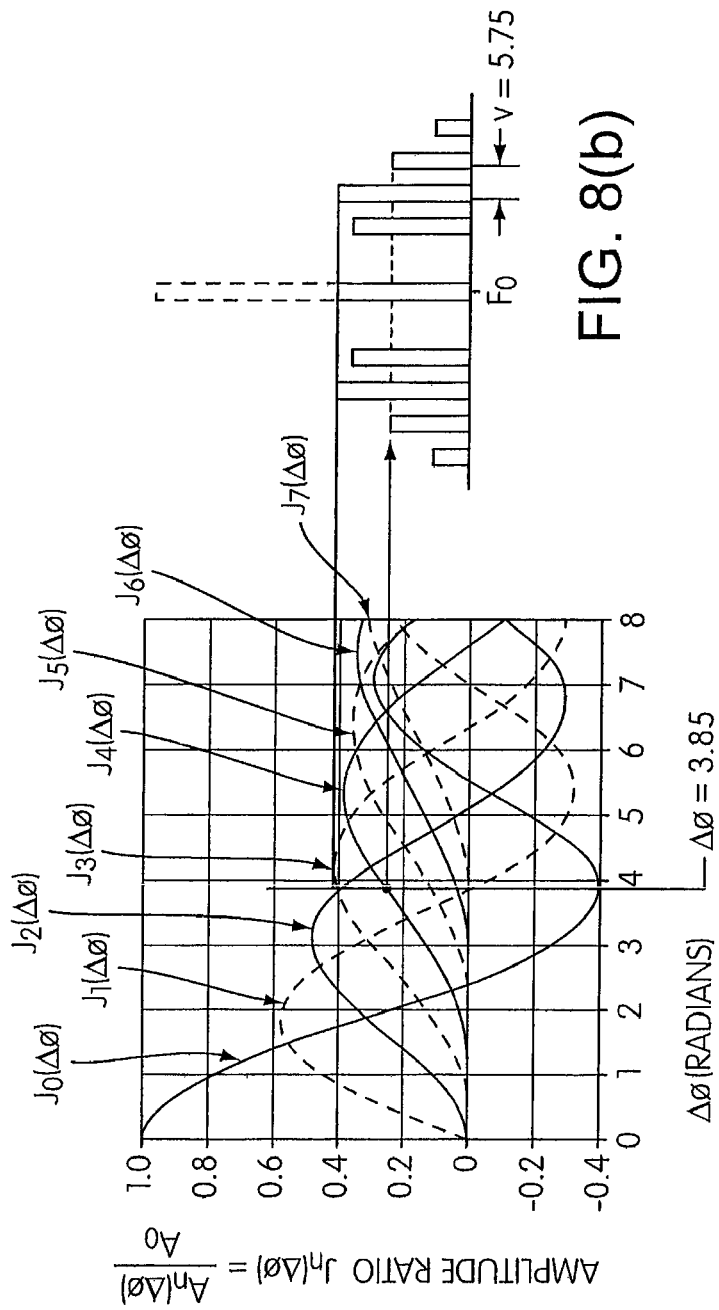
FIG. 8(a) shows FIG. 2a from the Ewald et al. article, which shows Bessel coefficients versus maximum phase deviation.
FIG. 8(b) shows FIG. 2b from the Ewald et al. article, which shows the frequency spectrum for a phase-modulated fan.

To accomplish the modulating of rotors 26 and 126 with an odd number of blades and with the desired modulation factors of m=1 and m=2 to form balanced rotors, $\Delta\phi$ is varied so that more harmonics ($J_2$, $J_3$, etc.) will be more even in amplitude, and near perfect balance is attained. Thus, an iterative optimization is used with the sinusoidal law. That is, the sinusoidal law as identified above in the Ewald et al. article is modified such that $\Delta\theta$ is replaced with $\Delta\theta_i$ for each harmonic and an additional restriction of balance given by the sum of sin θ and cos θ is added to an objective function. The objective function for determining the modulation factor m=1 for rotor 26 minimizes the following sum: (blade weighting)×(blade balance sum)+(Bessel weighting)×(Bessel values) subject to the minimum blade angle between blades. In the illustrated embodiment, the blade weighting was arbitrarily chosen to be 100 and the Bessel weighting was arbitrarily chosen to be 20. The minimum angle was arbitrarily chosen at 10 degrees but was later changed to 30, and then to 29. The exact values of $\Delta\phi$ can be approximated graphically from a plot of the Bessel functions as generally illustrated in FIG. 8(a) with respect to the Ewald et al article and in FIG. 10 with respect to the further embodiment of the subject application discussed below. The values of $\Delta\phi$ typically varied from 0 to 13. One constraint placed on the optimization routine was that a blade was not modulated so that the blade switches order. Also, increasing the revolutions per minute (RPM) of the rotor 26 improved the balance of the rotor 26. As an end result, the methodology of this embodiment of the subject application, that is, a modified sinusoidal law, leads to a substantially balanced rotor regardless of whether the modulation factor is prime with the number of blades.

For accomplish the modulating of rotor 126 with a modulation factor of m=2, a process similar to that used for determining the modulation of rotor 26 for modulation factor m=1 is used, but for modulating rotor 126 with a modulation factor of m=2 the evenness of the Bessel functions was not weighed into the equation.

For both cases of modulation factors m=1 and m=2, the rotors were not perfectly balanced using the sinusoidal law as applied in the Ewald et al. article or the U.S. Pat. No. 5,566,907. It is necessary to further vary the modulated angles to achieve a theoretical balance more perfect than manufacturing error. It is not preferable to manufacture the hub 30 to a greater tolerance than two decimal places, so in a spreadsheet numerical routine (any numerical method can be used, with the objective function to minimize balance error minus the sum of the sines and cosines as discussed in column 11 of U.S. Pat. No. 5,588,618) each iteration was rounded off to two decimal places so that the balanced rotor is within manufacturing tolerances, that is, the manufacturing tolerance errors are greater than the theoretically balanced error for the two decimal places specified.

Thus, through the above-described methodology, in the illustrated embodiment, a nine bladed modulated rotor 26 and 126 can be essentially balanced with a modulation factor m=1 and with a modulation factor of m=2.

Although the illustrated embodiment addresses the balancing of a rotor with nine blades, it should be understood that rotors having any desired number of blades can be balanced using the methodology of the subject application, including a prime number of blades. For example, a rotor with seven blades or with eleven blades can be balanced.

One preferred modulated spacing of the blades 32 for rotor 26 (m=1) is determined as set forth above and illustrated in FIGS. 3 and 5 and listed in FIG. 7 under the column "m=1." One preferred modulated spacing of the blades 32 for rotor 126 (m=2) is determined as set forth above and illustrated in FIGS. 4 and 6 and listed in FIG. 7 under the column "m=2."

Figure 10:
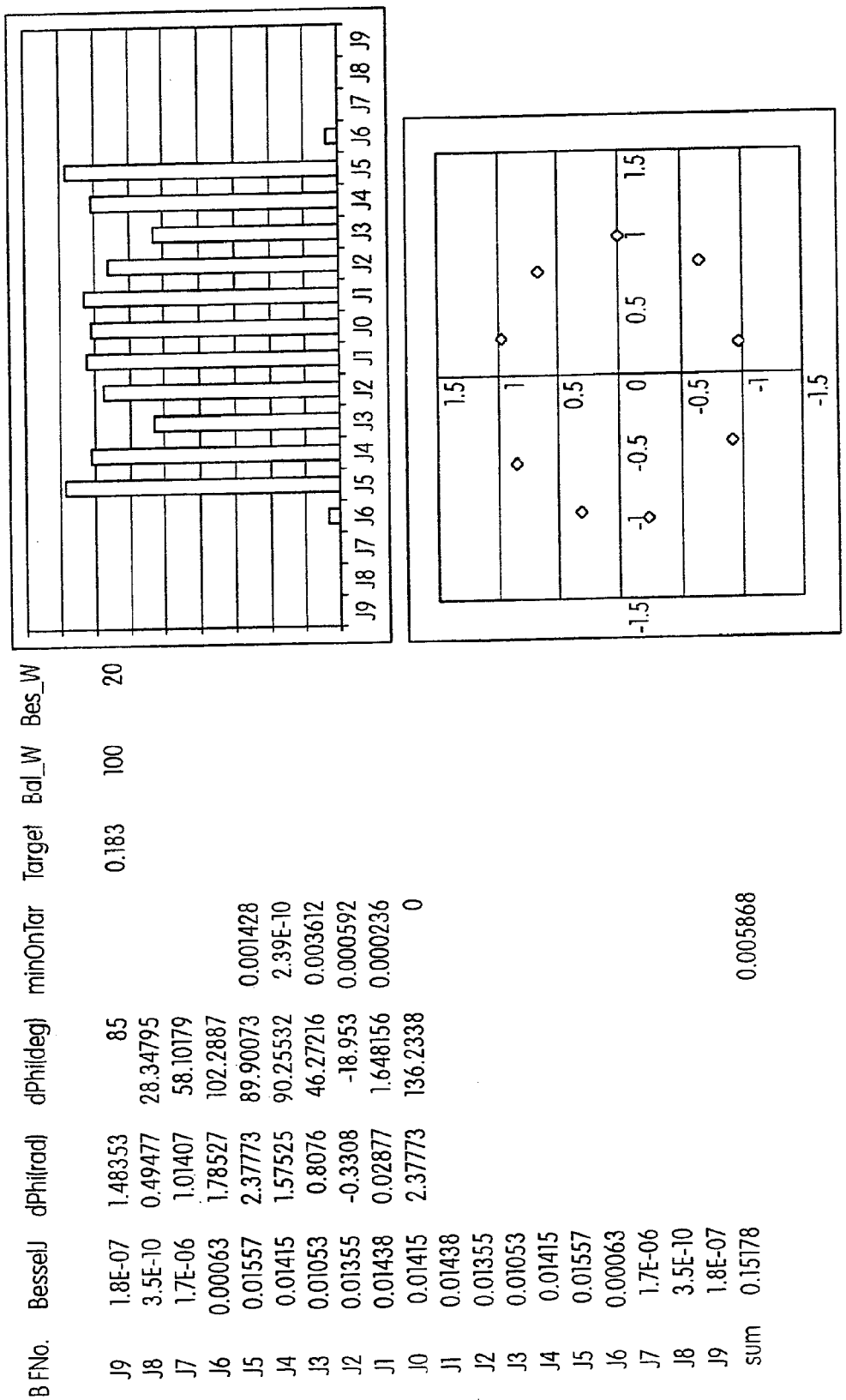
FIG. 10 shows the results of the iterative optimization of the sinusoidal law in determining modulated spacing for rotor blades for a rotor having nine blades and corresponding to the embodiment of FIG. 9.

FIGS. 9 and 10 also illustrate one application of the process set forth in the subject application for determining the modulated spacing of blades of a rotor in accordance with one embodiment of the invention. It should be understood that FIGS. 9 and 10 do not represent the only values that can be derived though the method described herein and merely constitutes one example of how actual numerical values can be applied to the process described herein for determining modulated blade spacing. Additionally, it should be understood that with the changing of the constants, the varying of the weighting factors, and the degree to which the optimization is performed, the results from using the methodology of the subject application can produce as many different results as there are variations to the equation and methodology. In FIGS. 9 and 10 the data and graphs are used to determine the modulated spacing of blades for a rotor having 9 blades and for a modulation factor of m=1. The methodology set forth above is employed and the data resulting from the use of the methodology is listed in FIGS. 9 and 10. Although FIGS. 9 and 10 illustrate the data and process for determining the modulation of rotor blades for a rotor with nine blades and a modulation factor of m=1, the process detailed in FIGS. 9 and 10 and as discussed above is equally applicable to any desired number of rotor blades and any desired modulation factor. Also, as is evident from the comparison of the modulated angles set forth with respect to the embodiment of FIG. 7 and with respect to the embodiment of FIG. 10, different modulation angles for a rotor with the same number of blades and the same modulation factor depending on the various constants that are selected for use in the equations described herein. The results from the use of the different values for the constants can be tested to determine the set of results providing the best performance.

In FIG. 9, the headings are defined as follows:

"No-B" is the selected number of rotor blades.

"B-No" is rotor blade number beginning at an arbitrary position.

"Def-Angle" is the defined or nominal angle determined by the blade number minus 1 times 360 degrees divided by the number of blades, or (B-No−1)×360°/No-B.

"m=1" is the selected modulation factor, in this case m equals one.

"dTheta" is delta theta i or $\Delta\theta_i$ and is determined by delta phi ($\Delta\phi$) divided by the number of blades, or dPhi(deg)/No-B.

"Phi-mod" is phi modulated or $\phi_{mod}$ and is determined by the nominal angle plus delta theta i times the sine of the modulation factor times the nominal angle, or Def-Angle+dTheta×sin(m×Def-Angle), which is the sinusoidal law.

"Σ sin=0?" is the sum of each sine of phi modulated for each of the blades.

"Σ cos=0?" is the sum of each cosine of phi modulated for each of the blades.

"Σ^2" is the sum of the sum of the sine of each phi modulated squared and the sum of the cosine of each phi modulated squared, or $\Sigma \sin=0?^2 + \Sigma \cos=0?^2$.

"Spacing" is the modulated angular spacing in degrees between adjacent rotors and is determined by subtracting phi modulated for the blade number minus phi modulated for the next blade number in order, or Phi-mod$_i$−Phi-mod$_{i+1}$.

"MinSp" is the selected, ideal minimum blade spacing.

In FIG. 10 the headings are as follows:

"BFNo." is the Bessel function harmonic number.

"BesselJ" is the absolute Bessel function value of delta phi (radians) for the corresponding Bessel function number.

"dPhi(rad)" is delta phi in radians.

"dPhi(deg)" is delta phi in degrees determined by an iterative optimization utilizing the balance given by the target balance weight.

"minOnTar" is the minimization on the target value for the optimization and is the absolute value of the Bessel function value (BesselJ) for the nth Bessel function harmonic minus the Bessel function value for the $0^{th}$ Bessel function harmonic, or $ABS(BesselJ_n-BesselJ_0)$.

"Target" is the target balance weight, which is determined by the sum of the sum of the sine of each phi modulated squared and the sum of the cosine of each phi modulated squared, or $\Sigma^2$ times the blade weighting factor plus the sum of the absolute Bessel function values (minOnTar) plus the Bessel weighting factor, or simply $(\Sigma^2 \times Bal\_W)+(\Sigma minOnTar+Bes\_W)$.

"Bal_W" is a selected blade weighting factor.

"Bes_W" is a selected Bessel weighting factor.

Although FIGS. 9 and 10 illustrate data and graphs with respect to a modulation factor of m=1, it should be understood that a similar methodology can be employed to determine the modulation angles of the rotor blades wherein modulation factor m=2. For example, for determining the modulation angles of the rotor blade for a modulation factor of m=2 the methodology used above for a modulation factor of m=1 for FIGS. 9 and 10 can be employed, but modified slightly so that the evenness of the Bessel functions is not weighed into the equation.

The line graph in FIG. 10 illustrates the relative evenness of the Bessel function. The plot in FIG. 10 illustrates the blade spacing. That is, each point on the plot represents a rotor blade position and the plot in whole provides a visual review of the distribution of angular spacing between each of the rotor blades.

Figure 11:
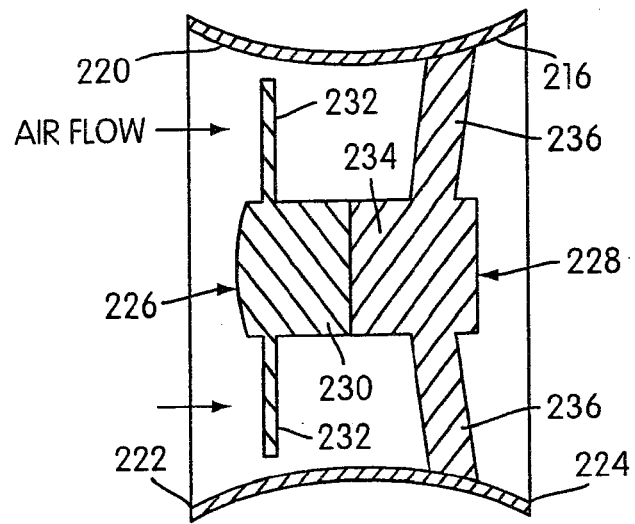
FIG. 11 is a cross-sectional view illustrating an embodiment of the rotor and the stator of the counter-torque device shown in FIG. 1.
Figure 12:
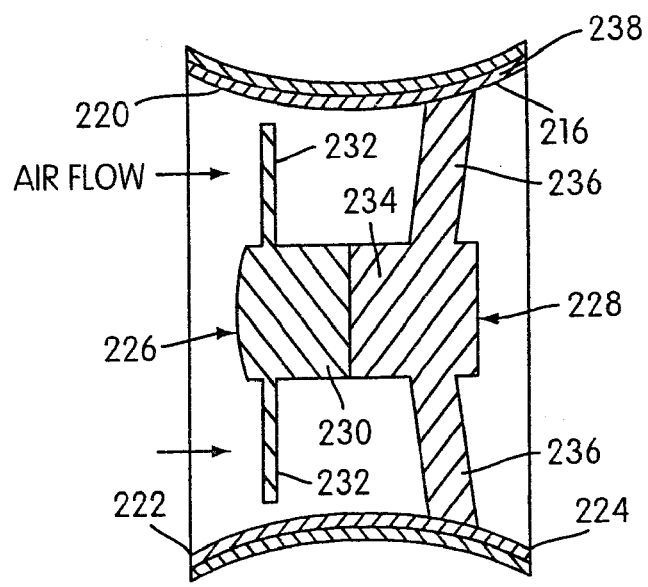
FIG. 12 is a cross-sectional view illustrating another embodiment of the rotor and the stator of the counter-torque device shown in FIG. 1.

FIG. 11 illustrates a rotor 226 and stator 228 mounted within a duct 216. The rotor includes a hub 230 and blades 232, and the stator includes a hub 234 and vanes 236. As illustrated the vanes 236 extend between the hub 234 and the duct surface 220. However, as shown in FIG. 12, the stator 228 may include an annular support disk 238 that is mounted within the duct 216 for purposes of mounting the vanes 236. Thus, the plurality of vanes 236 extend between the hub 234 and the support disk 238. Moreover, if a support disk 238 is provided within the duct 216, the annular inwardly facing surface of the support disk 238 constitutes the annular inwardly facing duct surface 220. The support disk 238 may be utilized with both modulated and un-modulated stator vanes 236.

In an embodiment of the invention, to reduce the perceived noise of the counter-torque device during operation and to improve performance of the counter-torque device, the vanes 236 of the stator 228 are angularly modulated around the hub 234 in accordance with an embodiment of the present invention. That is, the angular separation between each of the vanes 236 is not constant, but instead is varied. The stator vanes 236 are modulated such that only a portion of a rotor blade 232 intersects a portion of a stator vane 236 at any given time when a rotor blade 232 rotates around the axis of the duct and moves past each stator vane 236. That is, a full rotor blade 232 does not overlap a full stator vane 236 at any given time. Moreover, the intersection points between the rotor blades 232 and the respective stator vanes 236 at any given time each have a different radial length from the center of the rotor hub 230. Thus, the angular modulation of the stator vanes 236 ensures that no two rotor blades 232 pass over the same portion of a stator vane 236 at the same time. By varying the points at which the rotor blades 232 intersect respective stator vanes 236 at any given time, the noise generated at each of the intersections is diversified so as to reduce the perceived noise level of the counter-torque device. The modulated stator vanes 236 may be integrated into any suitable ducted counter-torque device.

FIGS. 13-14A and 15-21 show schematic representations of the rotor blades 232 and the stator vanes 236 to illustrate the relative relationships between the blades 232 and the vanes 236. FIGS. 13-14A and 15-21 show representations of the blades 232 and vanes 236 as seen from the stator-side of the tail fan. That is, FIGS. 13-14A and 15-21 illustrate the blades 232 and vanes 236 from the downstream side of the duct 216 looking upstream, or looking from the right to the left if looking at the cross-section of the duct 216 in FIGS. 11 and 12. FIG. 14B is an isolated view of the vanes 36 from the rotor-side of the tail fan.

Figure 13:
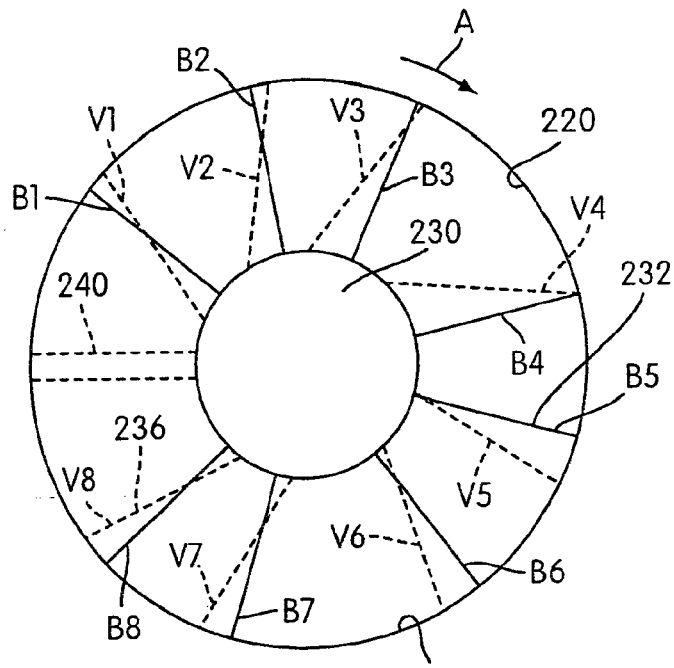
FIG. 13 is a schematic, upstream side view illustrating the blade centerlines of the blades of the rotor in solid lines intersecting with the vane centerlines of the vanes of the stator in dashed lines, the vanes of the stator being modulated in accordance with an embodiment of the invention.
Figure 14A:
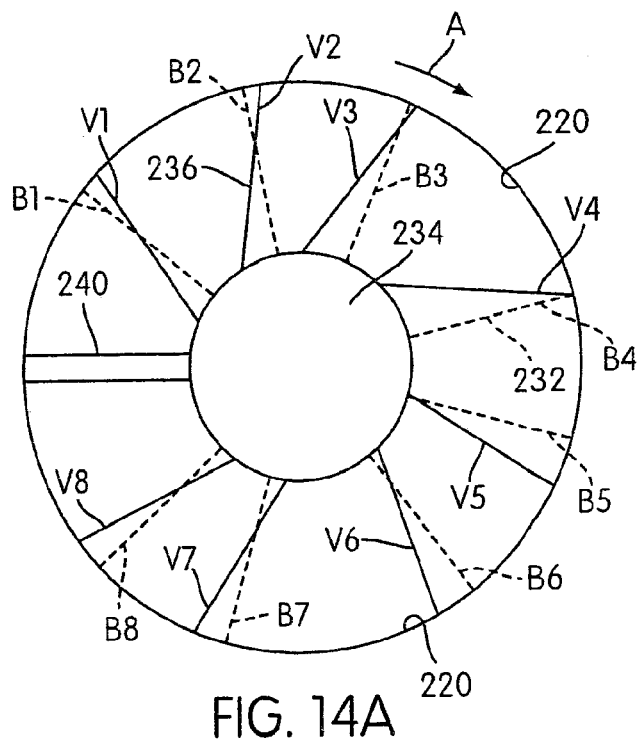
FIG. 14A is a schematic side view similar to FIG. 13 with the vane centerlines of the vanes of the stator in solid lines and the blade centerlines of the blades of the rotor in dashed lines.
Figure 15:
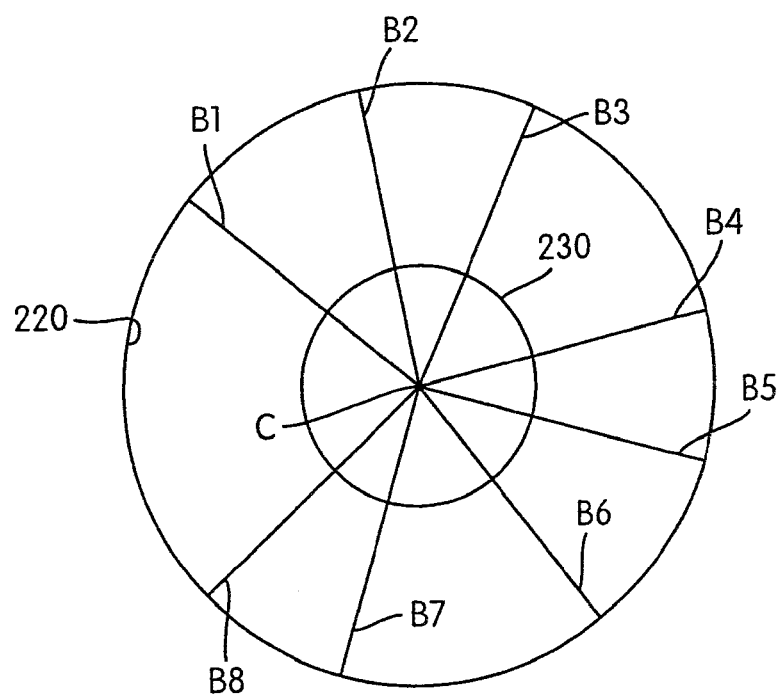
FIG. 15 is a schematic side view illustrating the blade centerlines of the blades of the rotor shown in FIG. 13 intersecting with one another at the center of the rotor hub.

FIGS. 13 and 14A schematically illustrate rotor blades 232 intersecting with stator vanes 236 modulated in accordance with an embodiment of the invention. Specifically, FIGS. 13 and 14A illustrate the blade centerlines of the rotor blades 232 intersecting with the vane centerlines of the modulated stator vanes 236 (FIG. 13 illustrates the blade centerlines in solid lines and the vane centerlines in dashed lines, whereas FIG. 14A illustrates the vane centerlines in solid lines and the blade centerlines in dashed lines). As best shown in FIG. 13, the rotor 226 includes eight blades 232, hence eight blade centerlines are successively labeled as B1 to B8. However, the rotor 226 may include any other suitable number of blades 232, e.g., nine blades. Also, in the illustrated embodiment, the blades 232 are modulated about the rotor hub 230. That is, the intersection angle between adjacent blade centerlines B1 to B8 is varied or non-uniform. However, the rotor 226 may include blades 232 that are un-modulated (equally or uniformly distributed) around the hub 230. Moreover, as shown in FIG. 15, the rotor blades 232 extend radially. That is, each of the blade centerlines B1 to B8 are radial and pass through the center C of the circular hub 230. However, the rotor 226 may include blades 232 that are non-radial. When operated, the rotor blades 232 rotate clockwise in the direction of arrow A (as viewed in FIGS. 13 and 14A).

Figure 14B:
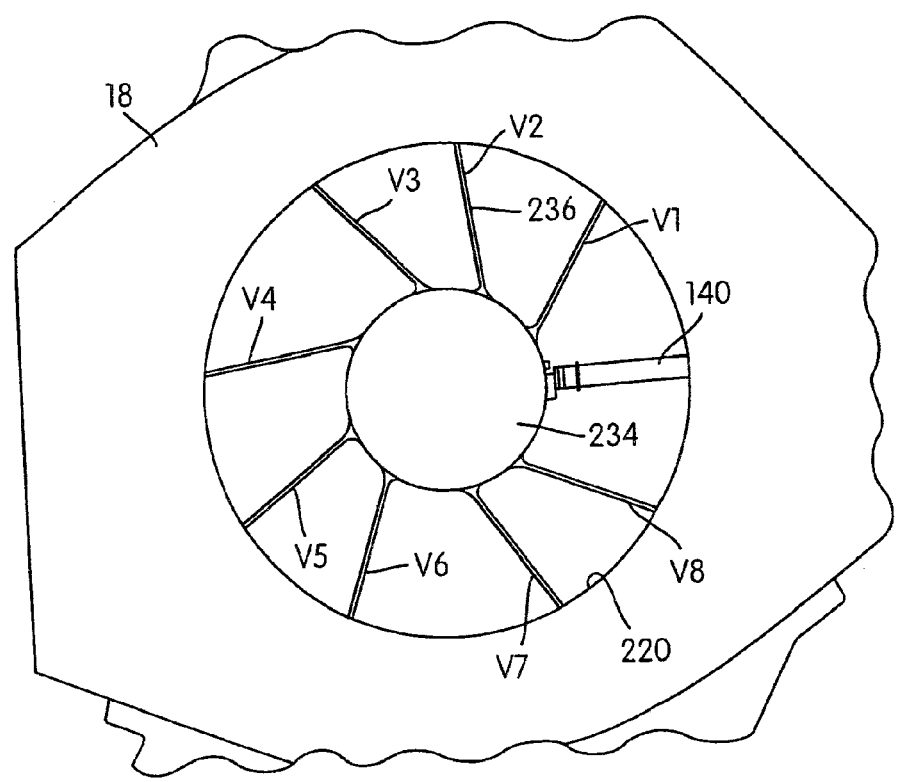
FIG. 14B is a side view of the stator shown in FIG. 13 from the rotor-side of the tail portion of a helicopter.

As best shown in FIGS. 14A and 14B, the stator 228 includes eight vanes 236, hence eight vane centerlines successively labeled as V1 to V8. However, the stator 228 may include any other suitable number of vanes 236. A drive shaft 140 powering the rotor 226 extends from the duct surface 220 to the hub 234 between vanes V1 and V8. The drive shaft 140 is drivingly engaged with the rotor 226 to operate the same. As seen from the orientation of FIG. 14A, the drive shaft 140 extends from the main portion of the helicopter toward the center of hub 234 to drive the rotor 226.

Figure 16:
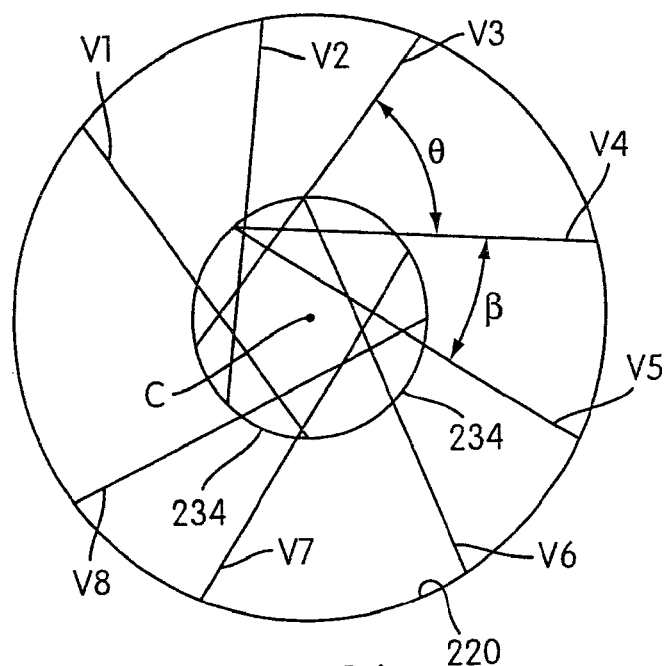
FIG. 16 is a schematic side view illustrating the vane centerlines of the vanes of the stator shown in FIG. 14 passing through the stator hub but not the center of the stator hub.

As best shown in FIGS. 14A and 14B, the stator vanes 236 are modulated in the same direction about the hub 234. Specifically, the stator vanes 236 are inclined with respect to the rotor blades 232 in the clockwise direction, in the direction of rotation A of the rotor 226. Thus, the vane centerlines V1 to V8 are inclined relative to the blade centerlines B1 to B8, and a full vane centerline V1-V8 will not overlap a full blade centerline B1-B8 at any given time. Moreover, the modulation angle between adjacent vane centerlines V1-V8 is varied or non-uniform. For example, as shown in FIG. 16, the angle θ between V3 and V4 is different than the angle β between V4 and V5.

Additionally, the stator vanes 236 are non-radial. As shown in FIG. 16, each of the vane centerlines V1-V8 passes through the circular hub 234, but not through the center C of the circular hub 234. Specifically, each vane centerline V1-V8 is tangent to a respective circle having the center C of the circular hub 234 as its axis. Thus, the modulation angles between the stator vane centerlines V1-V8 are continuously varied so that the stator vane centerlines V1-V8 do not have a radial configuration about the center C of the hub as do rotor blade centerlines B1-B8.

Figure 17:
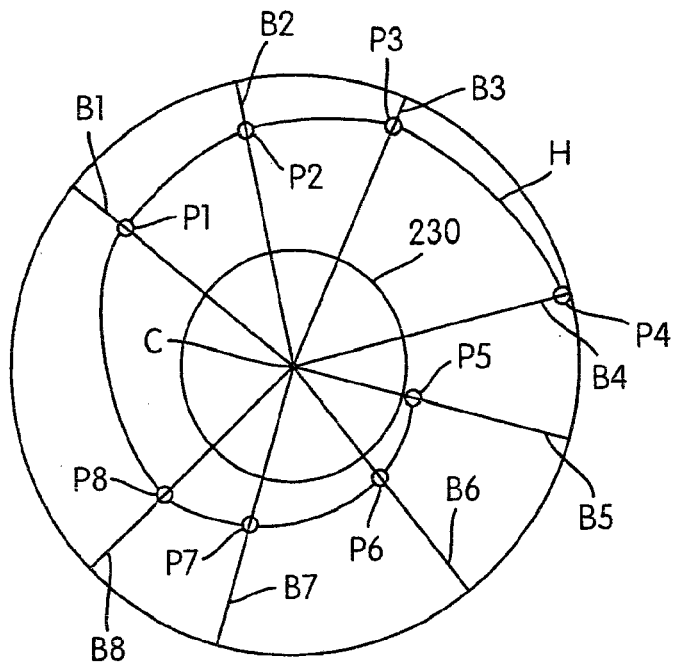
FIG. 17 is a schematic side view illustrating the blade centerlines of the blades of the rotor shown in FIG. 13 and an imaginary helix intersecting with each of the blades.

The modulation angles are a function of the circumferential position of each vane 236, which is a function of the rotor blade 232 distribution. That is, the orientation of each stator vane 236 is based on the rotor blade 232 distribution. In the illustrated embodiment, to determine the stator vane 236 modulation, a point is selected along each of the blade centerlines B1-B8 as shown in FIG. 17. Thus, eight points are selected and successively labeled as P1 to P8. The points P1-P8 are selected such that a line connecting the points forms an imaginary helix H. This arrangement positions the eight points P1-P8 such that each of the eight points P1-P8 has a different radial length from the center C of the hub 230. For example, P5 is closer to the center C than P6, and P6 is closer to the center C than P7, etc. The positioning of the eight points P1-P8 may be determined in any suitable manner, e.g., mathematical modeling, experimenting, etc.

Figure 18:
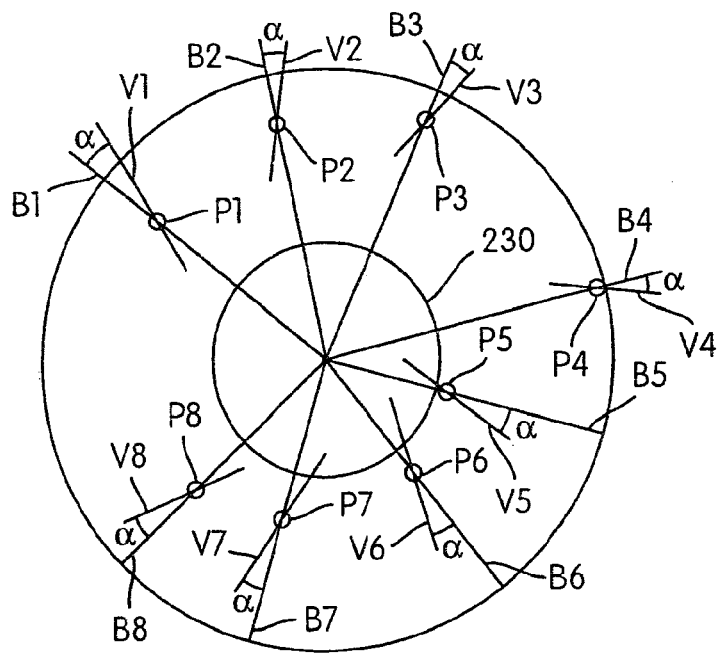
FIG. 18 is a schematic side view illustrating the blade centerlines of the blades of the rotor shown in FIG. 13 and inclined lines passing through each of the points at which the helix shown in FIG. 17 intersects with each of the blades.

Then, as shown in FIG. 18, an inclined line is passed through each of the points P1-P8 on the blade centerlines B1-B8. The lines are inclined in the same direction, i.e., in the direction of rotation A of the rotor 226. These lines define the vane centerlines V1-V8 of the vanes 236. As illustrated, the intersection angles α between the vane centerlines V1-V8 and respective blade centerlines B1-B8 are equal. In the illustrated embodiment, the angle α is approximately 17 degrees. However, the angle may have any suitable and appropriate magnitude, and the magnitude may be determined in any suitable manner, e.g., mathematical modeling, experimenting, etc.

Thus, when the rotor 226 is operated, the rotor blades 232 intersect with respective stator vanes 236 at about a 17 degree angle, but the point of intersection between each rotor blade 232 and respective stator vane 236 is at a different radial length from the center C of the hub 230. By changing how each rotor blade 232 crosses a respective stator blade 236, the sound generated from the crossing is diversified and not symmetric. For example, the sound generated when B1 crosses V1 will be different from the sound generated when B2 crosses V2, and the sound generated when B2 crosses V2 will be different from the sound generated when B3 crosses V3. The range of sounds reduces the perceived noise generated by the counter-torque device 14 during operation.

The arrangement of the stator 228 described above places each of the stator vanes 236 in tension when the rotor 226 is operating due to the torque created by the rotation of the rotor 226 wherein the torque is in the direction opposite to the direction of rotation of the rotor 226. In an embodiment where the annular support disk 238 is used, the tension of the vanes 236 may contract the support disk 238, which may create a negligible gap between the support disk 238 and the inner surface of the shroud defining the duct 216. However, it is preferable that the vanes 236 be designed such that the tension of the vanes 236 is negligible so that no contraction, or negligible contraction, of the support disk 238 occurs.

Figure 19:
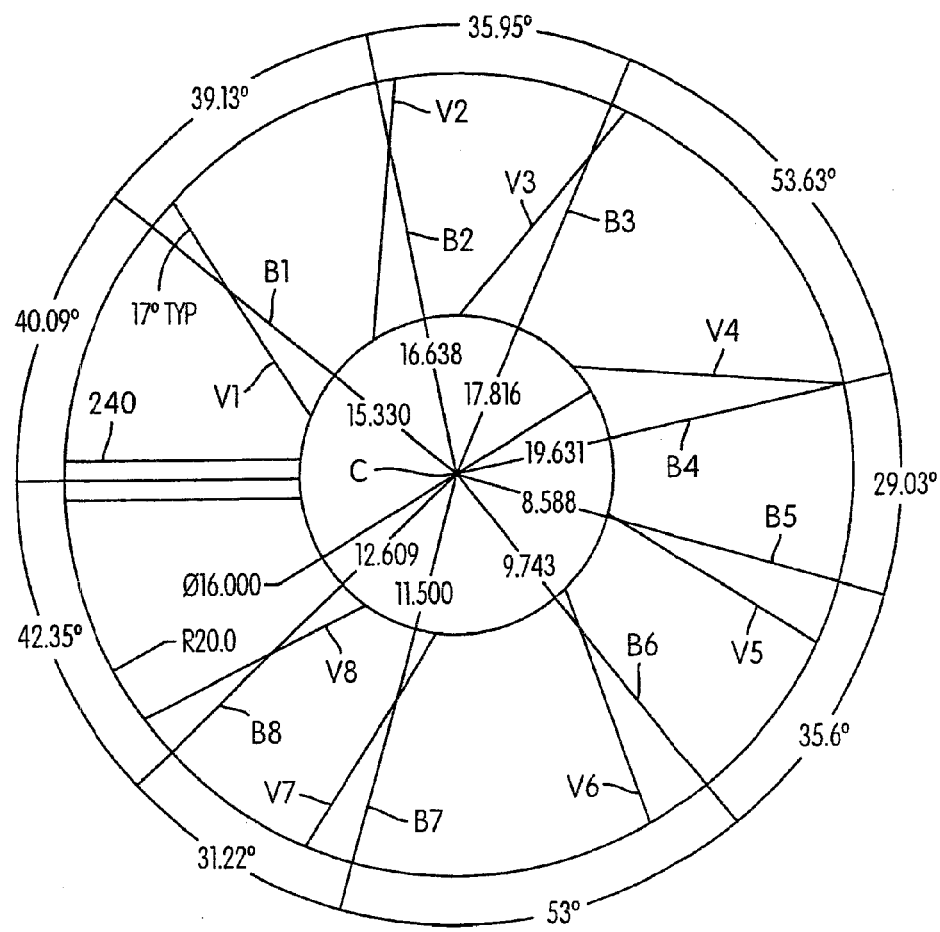
FIG. 19 is a schematic side view similar to FIG. 13 with dimensions of an exemplary embodiment.

FIG. 19 illustrates possible dimensions of the elements discussed with respect to FIGS. 13-18. It should be understood that the dimensions in FIG. 19 are only one example of the dimensions and proportions of the various elements illustrated.

Figure 20:
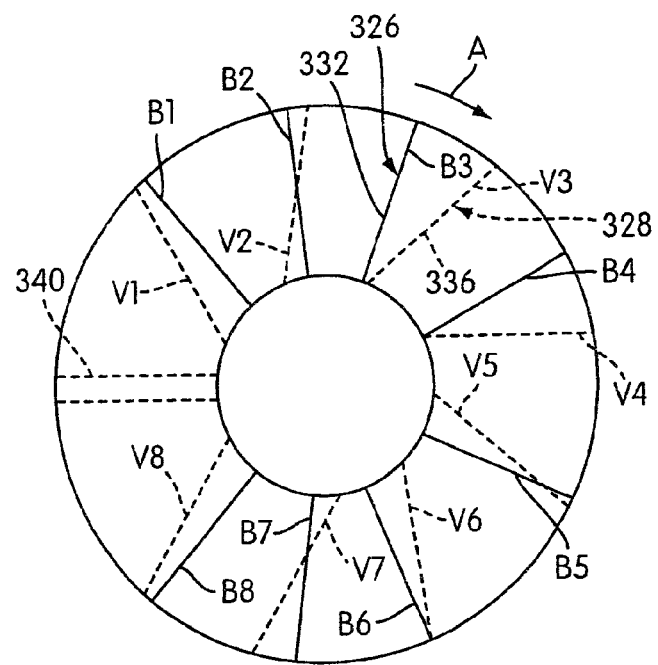
FIG. 20 is a schematic side view illustrating the blade centerlines of the blades of the rotor in solid lines intersecting with the vane centerlines of the vanes of the stator in dashed lines, the vanes of the stator being modulated in accordance with another embodiment of the invention.
Figure 21:
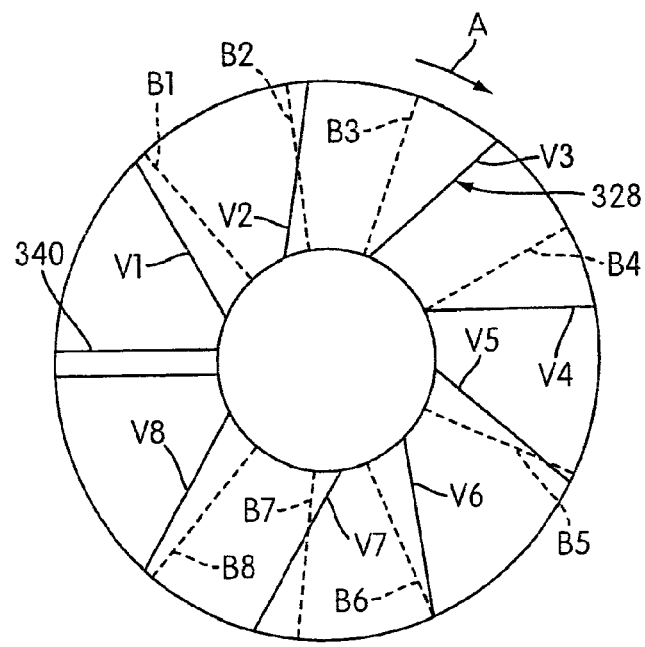
FIG. 21 is a schematic side view similar to FIG. 20 with the vane centerlines of the vanes of the stator in solid lines and the blade centerlines of the blades of the rotor in dashed lines.

FIGS. 20 and 21 schematically illustrate another embodiment of a stator 328 with modulated stator vanes 336. In this embodiment, one of the vanes 336 (each vane 336 and blade being represented by a center line) near the driveshaft 340, e.g., V8, is oppositely inclined with respect to the remaining vanes V1-V7. Specifically, V8 is inclined with respect to the rotor blades B1-B8 in the opposite direction of rotation A of the rotor 326.

This arrangement of the stator 328 places one vane V8 in compression and the remaining vanes V1-V7 in tension when the rotor 326 is operating. Moreover, this arrangement enables the two vanes V1 and V8 closest to the driveshaft 340 to be mounted close to areas of high stress, which leads to better stress flow, reduced weight, and improved structural integrity. Additionally, more than one of the vanes V1-V8 may be oppositely inclined.

It should be understood that the stators 228, 328 illustrated are only exemplary, and the stators 228, 328 may include stator vanes 236, 336 modulated in any suitable manner to reduce the perceived sound of a ducted counter-torque device of a helicopter and to improve structural integrity. Moreover, it should be understood that the determination of the stator vane modulation described above is only exemplary, and the stator vane modulation may be determined in any other suitable manner.

Figure 22:
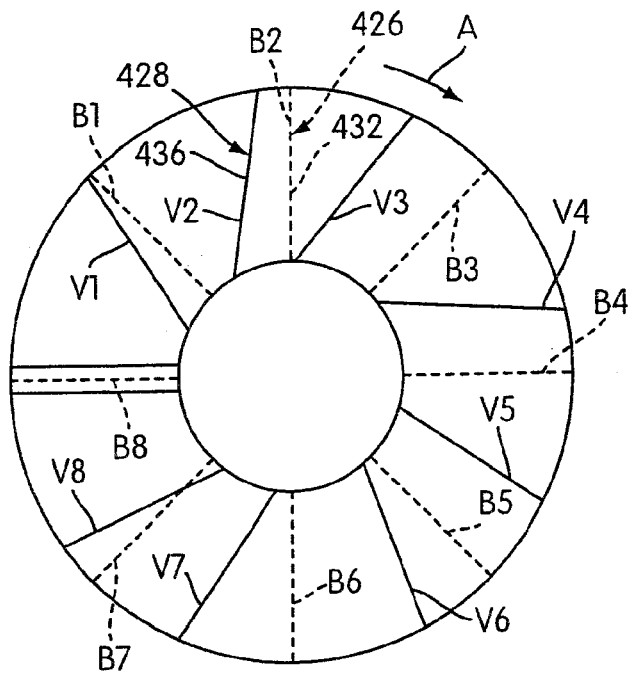
FIG. 22 is a schematic side view illustrating the blade centerlines of the blades of the rotor in dashed lines intersecting with the vane centerlines of the vanes of the stator in solid lines, the blades of the rotor being un-modulated and the vanes of the stator being modulated similar to FIG. 14.
Figure 23:
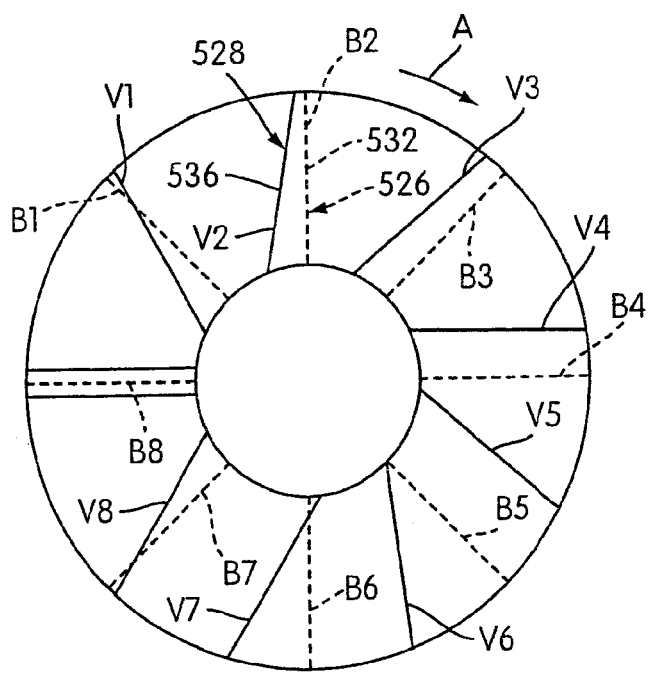
FIG. 23 is a schematic side view illustrating the blade centerlines of the blades of the rotor in dashed lines intersecting with the vane centerlines of the vanes of the stator in solid lines, the blades of the rotor being un-modulated and the vanes of the stator being modulated similar to FIG. 21.

Modulated stator vanes may be utilized with any suitable rotor including a rotor with modulated vanes and a rotor with un-modulated vanes. A rotor with unmodulated vanes refers to a rotor in which the angular spacing between adjacent rotor blades is constant. That is the rotor blades are evenly spaced around the hub such that the angle between every pair of rotor blades is the same. For example, FIG. 22 illustrates an embodiment wherein the blades 432 of the rotor 426 are un-modulated and the vanes 436 of the stator 428 are modulated similar to FIG. 14 and are substantially identical to the vanes discussed above with respect to similar to FIG. 14. FIG. 23 illustrates an embodiment wherein the blades 532 of the rotor 526 are un-modulated and the vanes 536 of the stator 528 are modulated similar to FIG. 21 and are substantially identical to the vanes discussed above with respect to similar to FIG. 21.

Also, in an embodiment, one of the angles between adjacent rotor blades may be equal to one of the angles between adjacent stator vanes. In one example, one of the angles between adjacent rotor blades of an un-modulated rotor may be equal to one of the angles between adjacent stator vanes of a modulated stator. In another example, one of the angles between adjacent rotor blades of a modulated rotor may be equal to one of the angles between adjacent stator vanes of a modulated stator.

Figure 24:
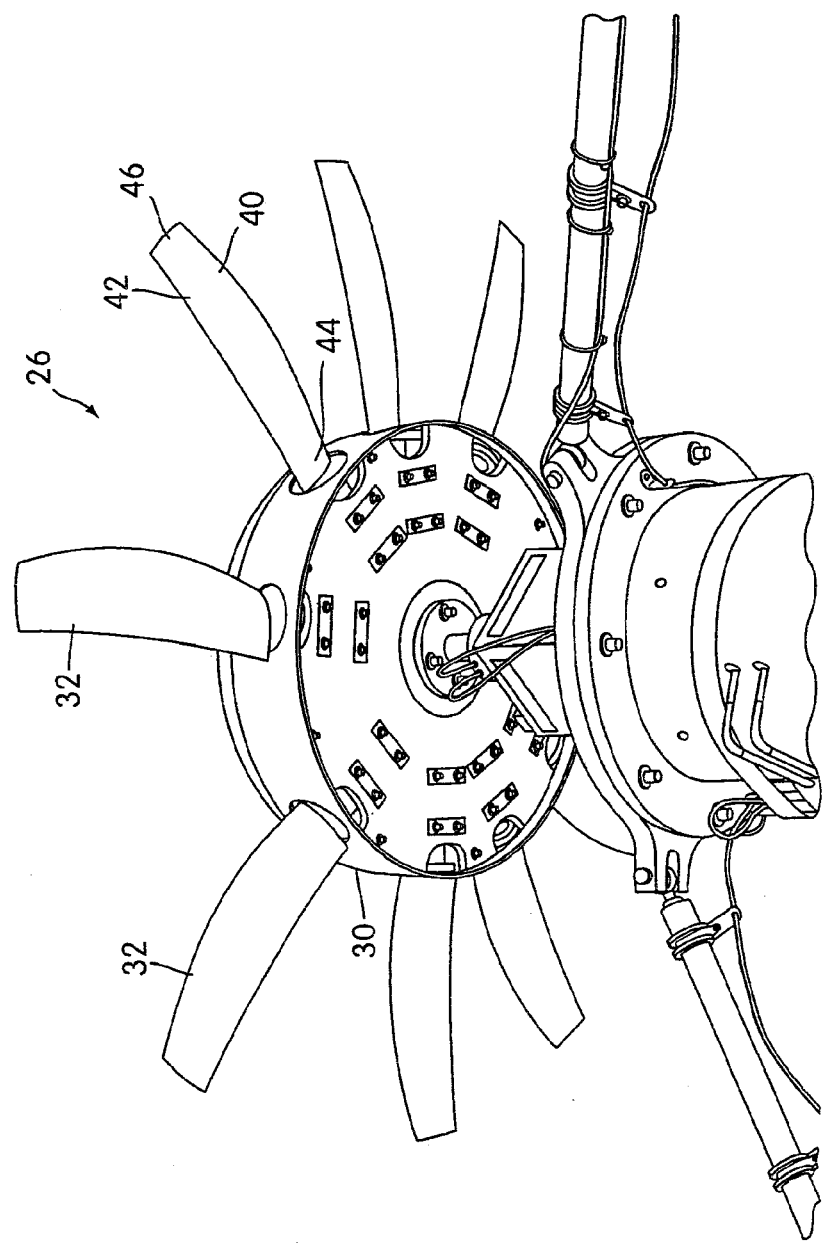
FIG. 24 is an isolated perspective view illustrating a rotor and the rotor blades thereof, the rotor blades being structured in accordance with an embodiment of the invention.
Figure 25:
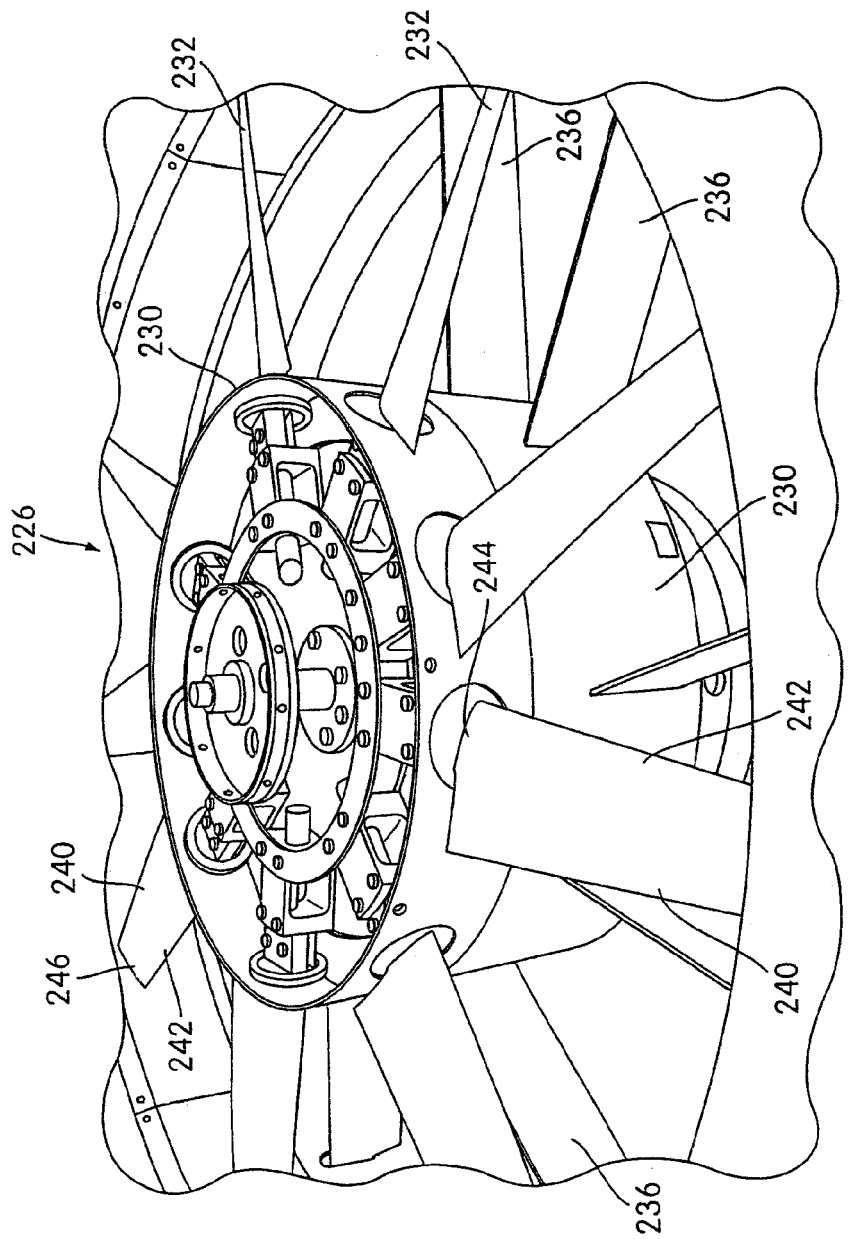
FIG. 25 is a perspective view illustrating a rotor and the rotor blades thereof, the rotor blades being structured in accordance with another embodiment of the invention.

FIGS. 24 and 25 illustrate two embodiments of rotors 26, 226 having substantially non-rectangular planform shaped rotor blades 32, 232 respectively. For example, each rotor blade may have a scimitar planform shape (see rotor blades 32 in FIG. 24), or each rotor blade may have a tapered planform shape (see rotor blades 232 in FIG. 25). The blades 32, 232 may be constructed from any suitable material, and may be constructed in any suitable manner.

Figure 26:
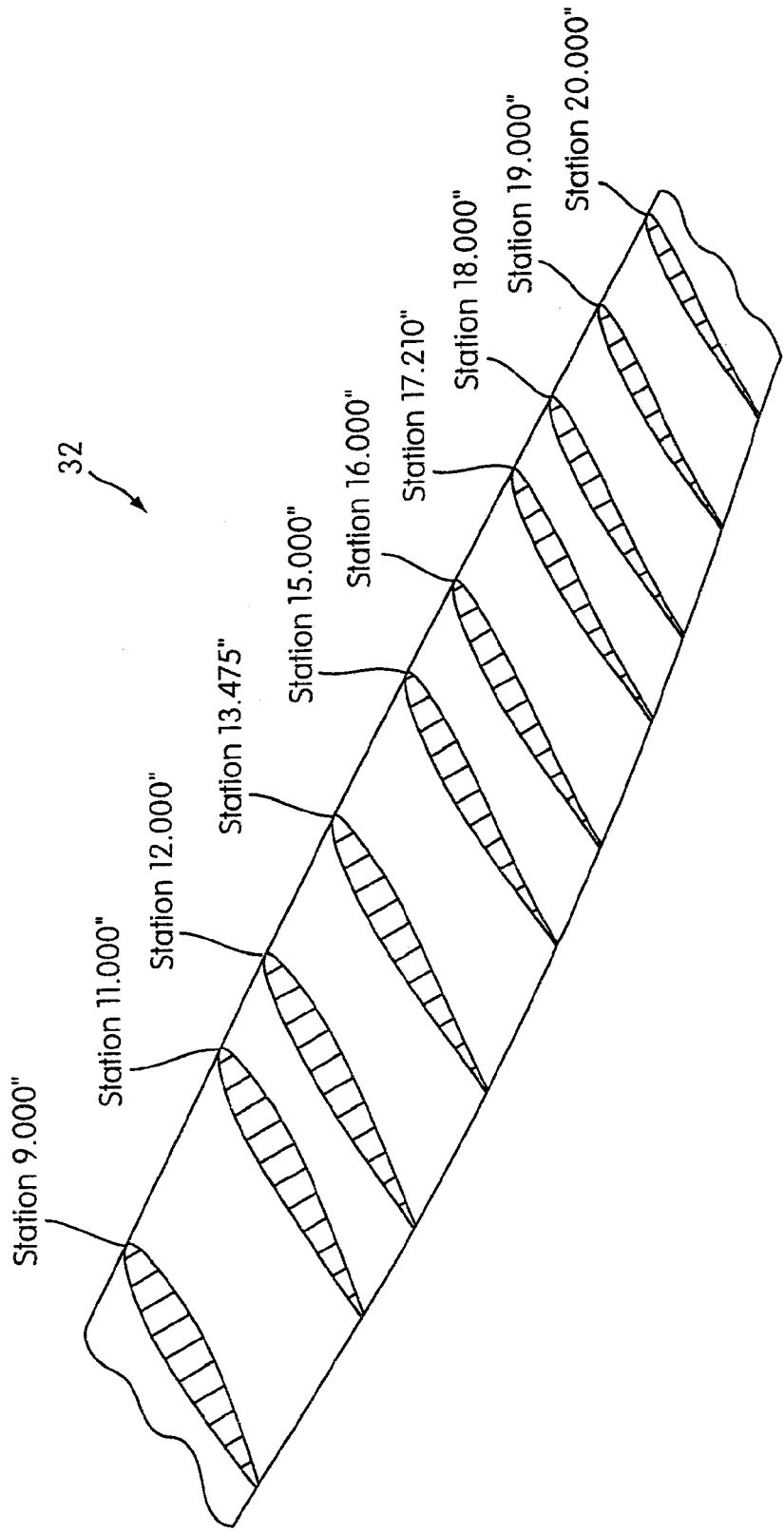
FIG. 26 is partial view of a rotor blade of the rotor shown in FIG. 24 with various cross-sections taken through different stations of the rotor blade.
Figure 27:
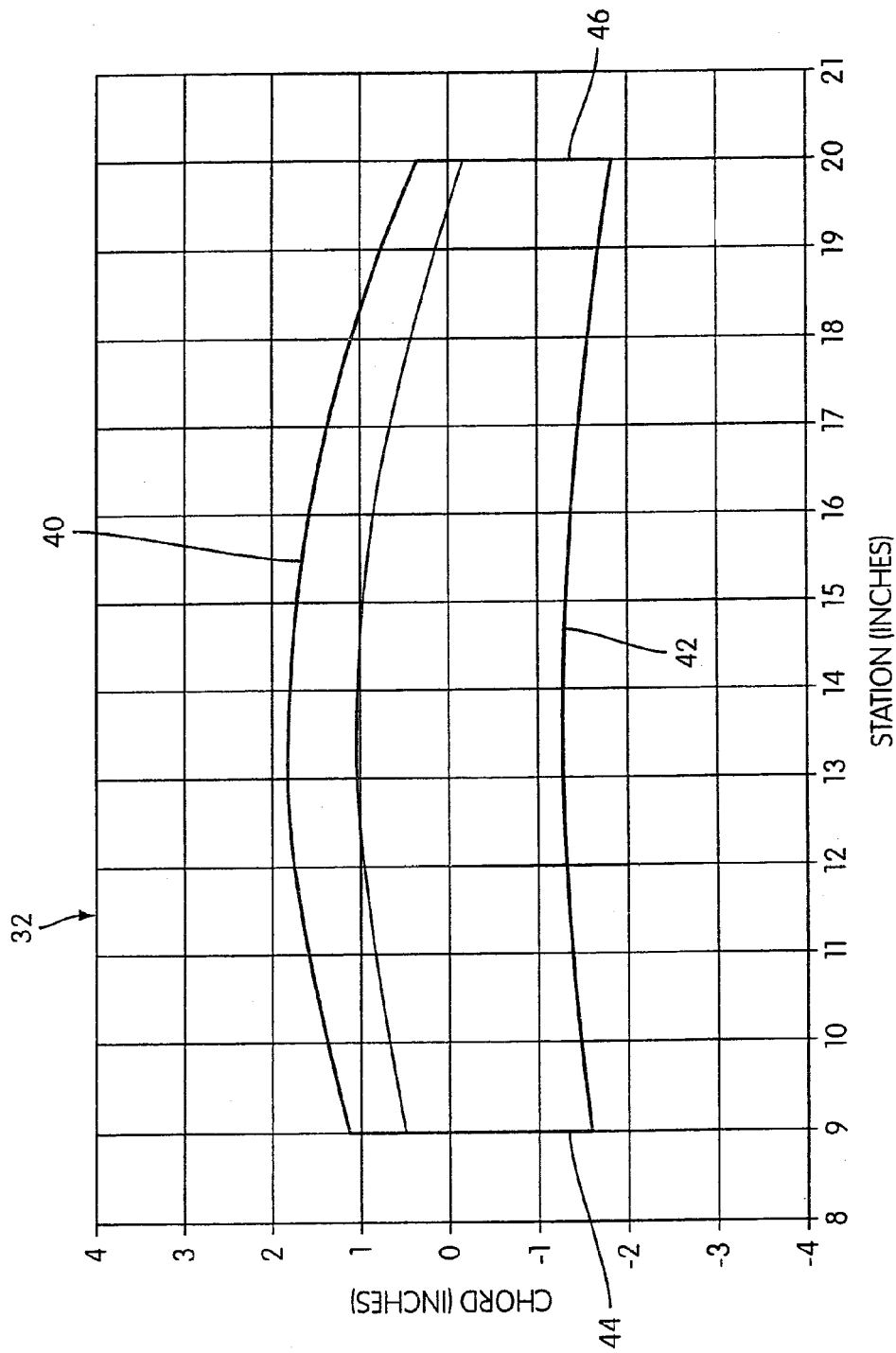
FIG. 27 is a plan view of the rotor blade shown in FIG. 26.

As shown in FIGS. 24, 26, and 27, the scimitar planform shaped blade 32 is formed like a saber having a curved blade. Specifically, the scimitar planform shaped blade 32 has a leading edge 40 that faces the direction of rotation of the rotor 26, and a trailing edge 42. As illustrated, the leading edge 40 has a generally convex configuration, and the trailing edge 42 has a slightly concave configuration. However, the trailing edge 42 may be generally parallel with a longitudinally extending centerline of the blade 32, or may have any other suitable configuration.

Also, as best shown in FIG. 24, the proximal edge 44 of the blade 32, adjacent the hub 30, and the distal edge 46 of the blade 32 are both generally perpendicular to the blade centerline. However, these edges 44, 46 may have any other suitable configuration, e.g., inclined, curved.

Thus, the edges 40, 42, 44, 46 of the blade 32 cooperate to form a substantially non-rectangular planform shape. In use, this shape helps to reduce the Mach compressibility effects and perceived noise while maintaining performance. Specifically, this substantially non-rectangular planform shape of the blade 32 keeps a length of the blade 32 from crossing a length of a stator vane 36 at any given time during operation.

As shown in FIG. 26, the cross-sectional configuration of the scimitar planform shaped blade 32 varies along the length thereof. FIG. 26 illustrates various cross-sectional configurations, shown with hatching, along the length of the blade and indicates the appropriate station (in inches) of the blade. (Although the cross-hatching of the various blade sections extends across each section, it does not necessarily mean that each section is solid. That is, the various sections may have different configurations from one another, and the configurations may be solid, hollow, multiple-layered, etc. The cross-hatching is for illustrative purposes only.) Also, the blade 32 has a twisted configuration.

Figure 30:
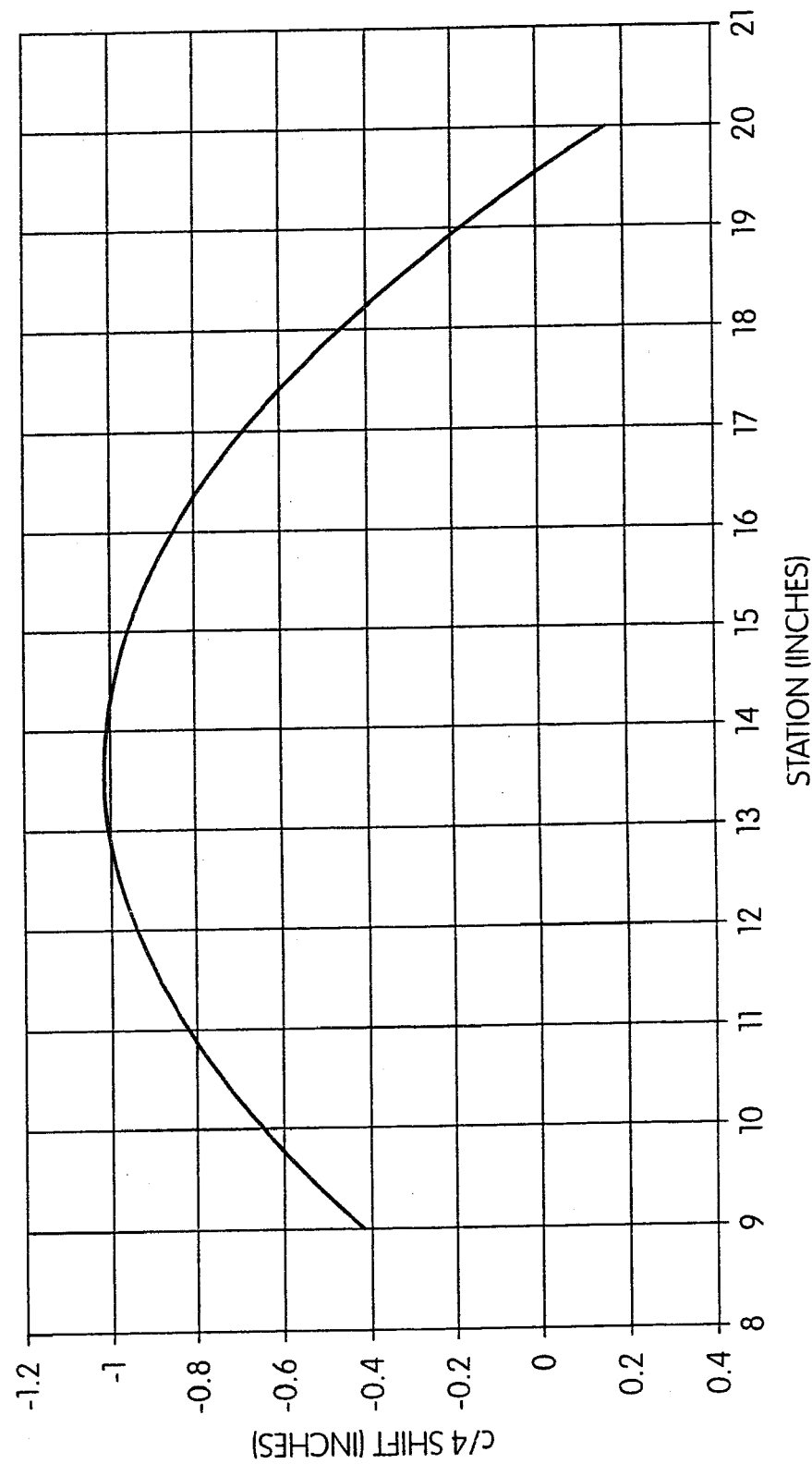
FIG. 30 is a graph illustrating the quarter chord shift distribution of the rotor blade shown in FIG. 26.
Figure 31:
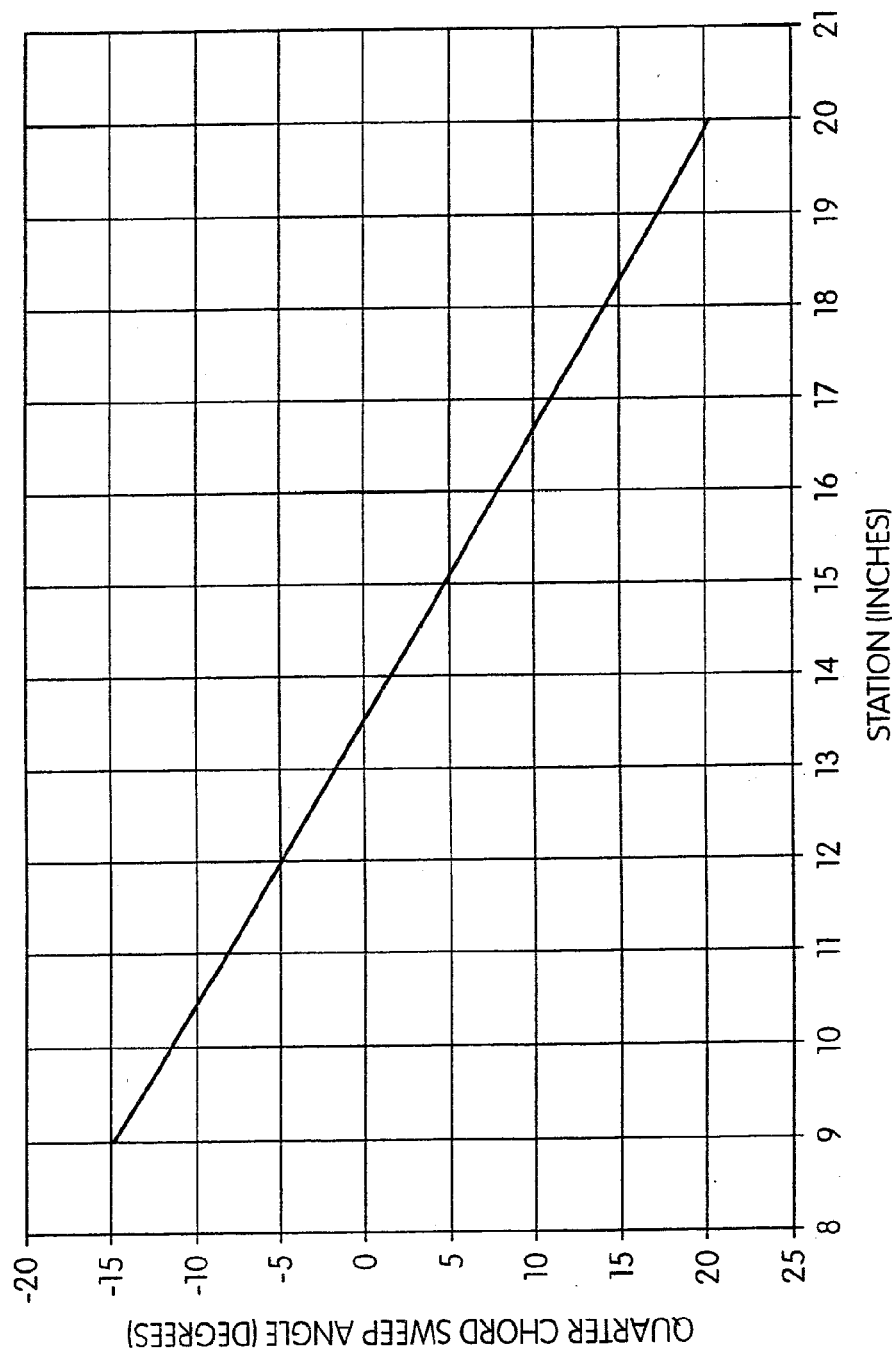
FIG. 31 is a graph illustrating the quarter chord sweep angle distribution of the rotor blade shown in FIG. 26.
Figures 32, 33:
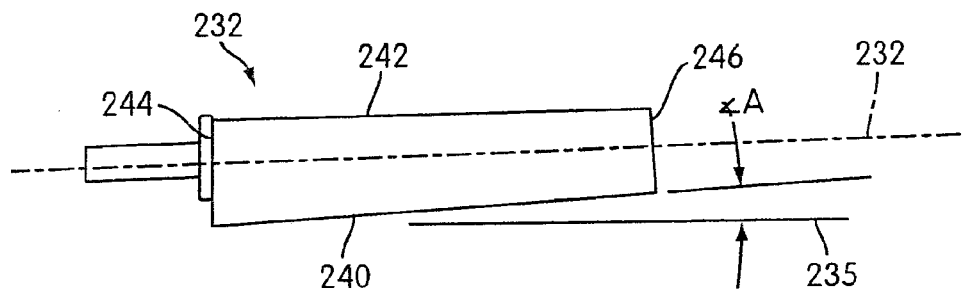
FIG. 32 is a table with dimensions of an exemplary embodiment of the rotor blade shown in FIG. 26.
FIG. 33 illustrates one embodiment of a planform of a tapered blade.

FIGS. 27-31 are graphs that define the specific geometric configuration of the scimitar planform shaped blade 32. Also, FIG. 32 is a table that illustrates possible dimensions of the elements discussed with respect to FIGS. 27-31. It should be understood that the dimensions and geometric proportions illustrated in FIGS. 27-32 are only one example of the dimensions and proportions of the various elements illustrated.

FIGS. 27-32 illustrate ten stations (sections) of the scimitar planform shaped blade 32, i.e., ST 9.000, 11.000, 12.000, 13.475, 15.000, 16.000, 17.210, 18.000, 19.000, and 20.000. In the illustrated embodiment, the thrust weighted solidity of the blade is 2.75" and the trailing edge thickness is 0.035". However, the blade 32 may have any other suitable weighted solidity and trailing edge thickness.

FIG. 27 illustrates the dimensions of the illustrated embodiment by plotting the chord length in inches versus the blade station.

Figure 28:
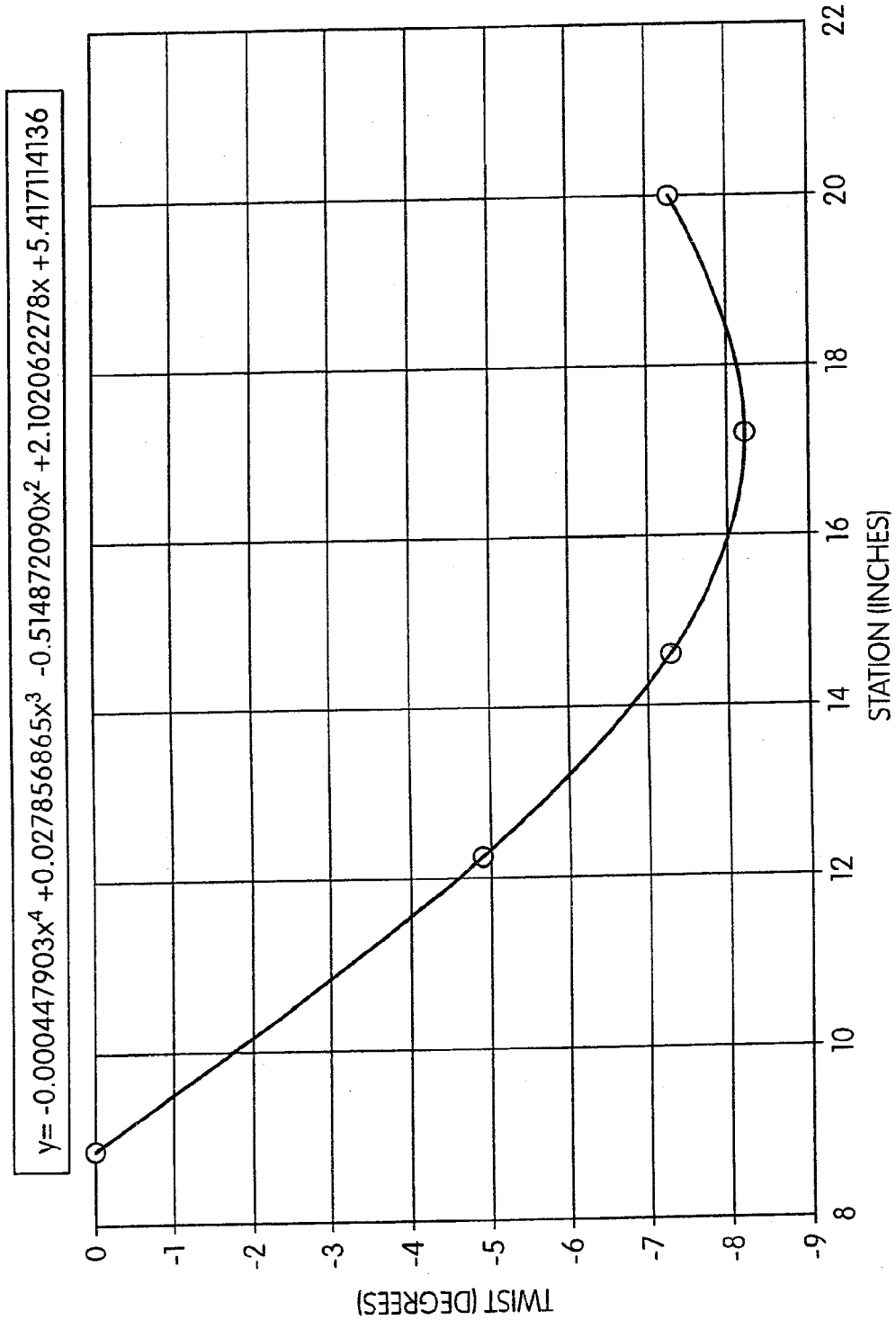
FIG. 28 is graph illustrating the twist distribution of the rotor blade shown in FIG. 26.

As shown in FIG. 28 as a graph of the degrees of twist at each blade station, the desired chord plane twist (degrees) as a function of the station location (inches) is defined by:

$$\text{Twist(deg)} = -0.000447903 * ST^4 + 0.0278569 * ST^3 - 0.514872 * ST^2 + 2.10206 * ST + 5.41711$$

Figure 29:
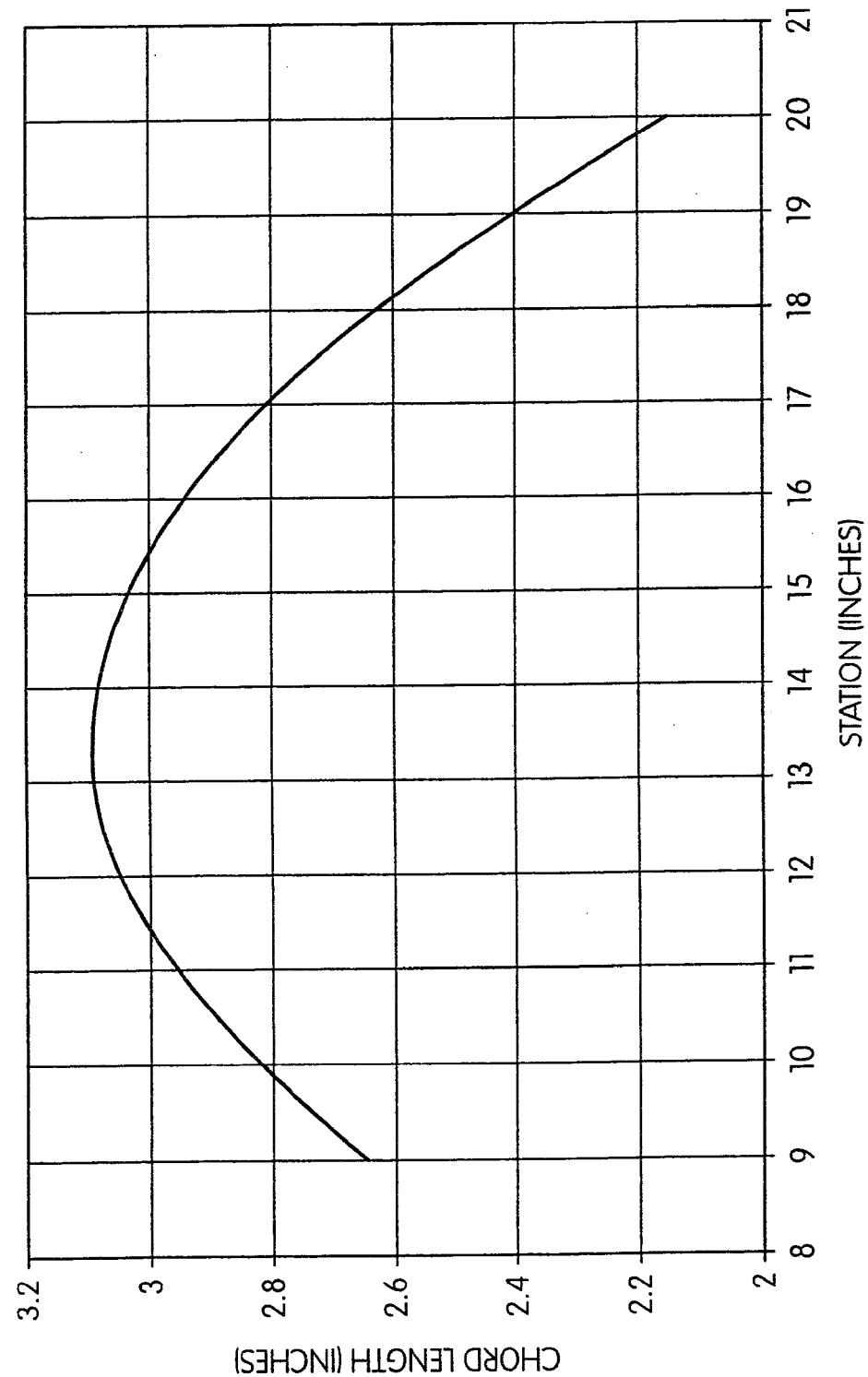
FIG. 29 is a graph illustrating the chord distribution of the rotor blade shown in FIG. 26.

As shown in FIG. 29 as a graph of the chord length in inches at each station, the chord length (inches) as a function of station location (inches) is defined by:

$$\text{Chord(in)} = -0.02197 * ST^2 + 0.592025 * ST - 0.8989$$

As shown in FIG. 30 as a graph of the quarter-chord shift in inches at each station, the quarter chord off-set (inches) that defines the sweep as a function of station location (inches) is defined by:

$$\Delta c/4 = 0.02883 * ST^2 - 0.7832 * ST + 4.714 - 0.41$$

Wherein "c/4" stands for quarter-chord, or one quarter of the length of the chord, and $\Delta c/4$, or delta quarter chord stands for the change or shift in the quarter chord, and ST stands for a station location in inches.

As illustrated, the twist of the blade 32 increases from station 9 to 17.210, then the twist slightly decreases from station 17.210 to 20. Also, the chord length increases from station 9 to 13.475, and then sharply decreases from station 13.475 to 20. This variation in chord length gives the blade 32 its scimitar planform shape. FIGS. 30 and 31 also illustrate the variation of the quarter chord shift and quarter chord sweep angle about the station 13.475. FIG. 31 shows a graph of the quarter chord sweep angle in degrees at each blade station.

FIGS. 25 and 33 illustrate tapered rotor blade 232 having a tapered planform shape. Specifically, the trailing edge 240 of each of the blades 232 is inclined towards a longitudinally extending centerline of the blade 232. As illustrated in FIG. 33, the trailing edge 240 is inclined relative to a line 235 that is substantially parallel to the centerline 232 by an angle A. The leading edge 242 is substantially parallel with respect to the blade centerline 232. However, the leading and trailing edges may have other suitable configuration, e.g., inclining the leading edge 242 relative to the centerline 232 along with the inclined trailing edge 240 or by itself instead of the inclined trailing edge 240.

Also, the proximal edge 244 of the blade 232 and the distal edge 246 of the blade 232 are both generally perpendicular to the blade centerline. However, these edges 244, 246 may have any other suitable configuration, e.g., inclined.

Thus, the edges 240, 242, 244, 246 of the blade 232 cooperate to form a substantially non-rectangular planform shape. When the rotor 226 is operated, the blades 232 intersect with respective stator vanes 36 at an incline. By changing how each rotor blade 232 crosses a respective stator blade 36, the perceived noise generated by the counter-torque device is reduced during operation.

It is contemplated that the stator vanes 36 may have a substantially non-rectangular planform shape, e.g., scimitar, tapered. In such construction, the rotor blades of the rotor may have a rectangular planform shape. In use, the blades and vanes would intersect one another at an incline to provide the noise reducing benefit.

It should be understood that the rotors 26, 226 illustrated are only exemplary, and the rotors 26, 226 may include rotor blades 32, 232 with any other suitable substantially non-rectangular planform shape so as to reduce the perceived sound of a counter-torque device of a helicopter and to improve aerodynamic performance of a counter-torque device.

FIGS. 24 and 25 show schematic representations of the rotor blades 32, 232 and the stator vanes 36, 236 to illustrate the relative relationships between the blades 32, 232 and the vanes 36, 236. FIGS. 24 and 25 show representations of the blades 32, 232 and vanes 36, 236 as seen from the stator-side of the tail fan 12 (shown in FIG. 1). That is, FIGS. 24 and 25 illustrate the blades 32, 232 and vanes 36, 236 from the downstream side of the duct 16, 216 looking upstream, or looking from the right to the left if looking at the cross-section of the duct 216 in FIG. 12. FIG. 26 is an isolated view of the vanes 36, 236 from the rotor-side of the tail fan.

Figure 34:
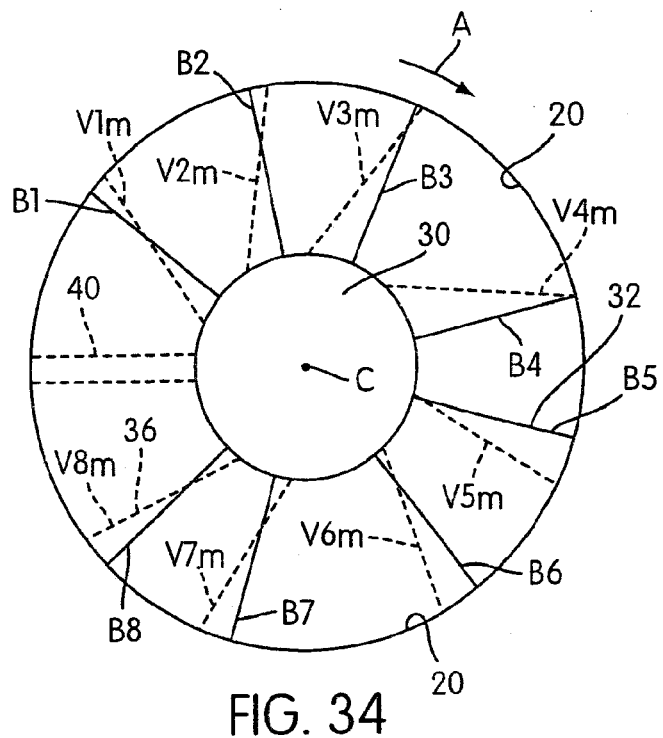
FIG. 34 is a schematic illustration showing the relative positioning of rotor blades and stator vanes in accordance with another embodiment of the subject invention, showing modulated rotor blades and modulated stator vanes.
Figure 35:
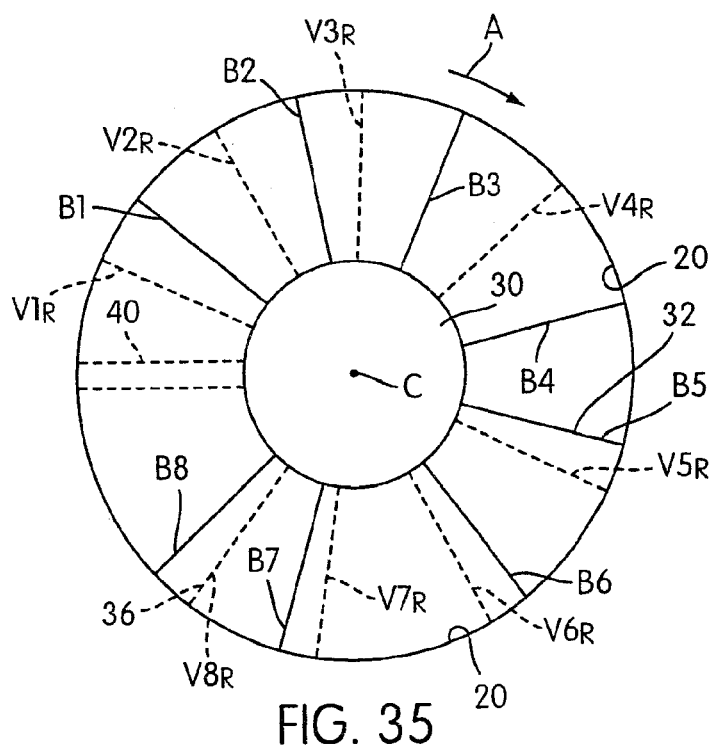
FIG. 35 is a schematic illustration showing the relative positioning of rotor blades and stator vanes in accordance with another embodiment of the subject invention, showing unmodulated rotor blades and modulated stator vanes.

FIG. 34 schematically illustrates rotor blades 32 intersecting with stator vanes 36 modulated in accordance with an embodiment of the invention. Specifically, FIG. 34 illustrate the blade centerlines of the rotor blades 32 intersecting with the vane centerlines of the modulated stator vanes 36 (FIGS. 34 and 35 illustrate the blade centerlines in solid lines and the vane centerlines in dashed lines). The rotor 26 includes eight blades 32, hence eight blade centerlines are successively labeled as B1 to B8. The rotor 26 may include any other suitable number of blades 32, e.g., nine blades. Also, in the illustrated embodiment, the blades 32 are modulated about the rotor hub 30. That is, the intersection angle between adjacent blade centerlines B1 to B8 is varied or non-uniform. Since the angles between each blade centerline varies, the rotor blades 32 are angularly modulated. However, the rotor 26 may include blades 32 that are equally or uniformly distributed around the hub 30. Moreover, as shown in FIG. 14, the rotor blades 32 extend radially from the center C of the hub 30. That is, each of the blade centerlines B1 to B8 are radial and pass through the center C of the circular hub 30. However, the rotor 26 may include blades 32 that are non-radial. When operated, the rotor blades 32 rotate clockwise in the direction of arrow A (as viewed in FIG. 34).

Figure 36:
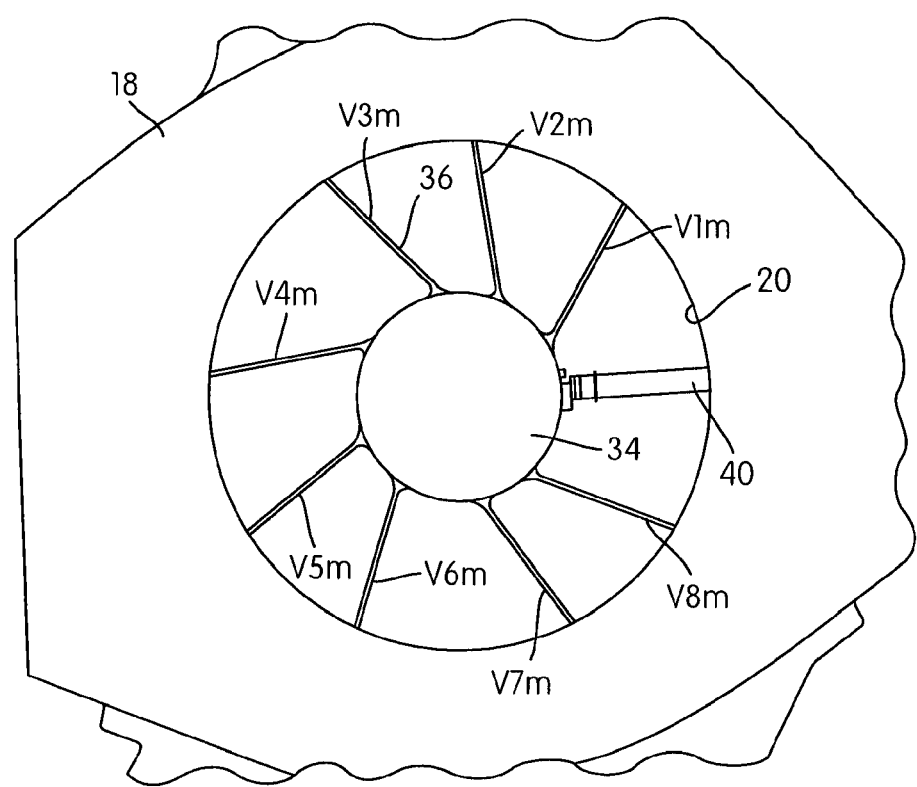
FIG. 36 is a side view of the modulated stator vanes shown in FIG. 34 from the rotor-side of the tail portion of a helicopter.

As shown in FIGS. 34 and 36, the stator 28 includes eight vanes 36, hence eight vane centerlines successively labeled as $V1_m$ to $V8_m$. (The subscript "m" indicates that the vanes are angularly modulated.) However, the stator 28 may include any other suitable number of vanes 36. A drive shaft 40 powering the rotor 26 extends from the duct surface 20 to the hub 34 between vanes $V1_m$ and $V8_m$. The driveshaft 40 is drivingly engaged with the rotor 26 to operate the same. As seen from the orientation of the figures, the drive shaft 40 extends from the main portion of the helicopter toward the center of hub 34 to drive the rotor 26.

As shown in FIGS. 34 and 36, the stator vanes 36 are modulated in the same direction about the hub 34. Specifically, the stator vanes 36 are inclined with respect to the rotor blades 32 in the clockwise direction, in the direction of rotation A of the rotor 26. Thus, the vane centerlines $V1_m$ to $V8_m$ are inclined relative to the blade centerlines B1 to B8, and a full vane centerline $V1_m$-$V8_m$ will not overlap a full blade centerline B1-B8 at any given time. Moreover, the modulation angle between adjacent vane centerlines $V1_m$-$V8_m$ is varied or non-uniform.

Additionally, the stator vanes 36 are non-radial. As shown in FIG. 34, each of the vane centerlines $V1_m$-$V8_m$ passes through the circular hub 34, but not through the center C of the circular hub 34. Specifically, each vane centerline $V1_m$-$V8_m$ is tangent to a respective circle having the center C of the circular hub 34 as its axis. Thus, the modulation angles between the stator vane centerlines $V1_m$-$V8_m$ are continuously varied so that the stator vane centerlines $V1_m$-$V8_m$ do not have a radial configuration about the center C of the hub as do rotor blade centerlines B1-B8.

The modulation angles are a function of the circumferential position of each vane 36, which is a function of the rotor blade 32 distribution. That is, the orientation of each stator vane 36 is based on the rotor blade 32 distribution. In the illustrated embodiment, to determine the stator vane 36 modulation, a point is selected along each of the blade centerlines B1-B8. Thus, eight points are selected. The points are selected such that a line connecting the points forms an imaginary helix. This arrangement positions the eight points such that each of the eight points has a different radial length from the center C of the hub 30. The positioning of the eight points may be determined in any suitable manner, e.g., mathematical modeling, experimenting, etc.

Then, an inclined line is passed through each of the points on the blade centerlines B1-B8. The lines are inclined in the same direction, i.e., in the direction of rotation A of the rotor 26. These lines define the vane centerlines $V1_m$-$V8_m$ of the vanes 36. The intersection angles between the vane centerlines $V1_m$-$V8_m$ and respective blade centerlines B1-B8 are equal. In the illustrated embodiment, the angle is approximately 17 degrees. However, the angle may have any suitable and appropriate magnitude, and the magnitude may be determined in any suitable manner, e.g., mathematical modeling, experimenting, etc.

Thus, when the rotor 26 is operated, the rotor blades 32 intersect with respective stator vanes 36 at about a 17 degree angle, but the point of intersection between each rotor blade 32 and respective stator vane 36 is at a different radial length from the center C of the hub 30. By changing how each rotor blade 32 crosses a respective stator blade 36, the sound generated from the crossing is diversified and not symmetric. For example, the sound generated when B1 crosses $V1_m$ will be different from the sound generated when B2 crosses $V2_m$, and the sound generated when B2 crosses $V2_m$ will be different from the sound generated when B3 crosses $V3_m$. The range of sounds reduces the perceived noise generated by the counter-torque device 15 during operation. The above modulation of blades 32 can be accomplished with blades of any planform shape, including substantially rectangular and substantially nonrectangular, including tapered planforms and scimitar planforms.

However, since the blade planform shapes in accordance with the described embodiments of the invention are substantially nonrectangular, the same advantages described above using modulated stator vanes 36 can be accomplished with stators 36 that are radial. That is, whereas the stators of FIG. 34 do not extend from centerpoint C, the stators of FIG. 35 do extend from the centerpoint C and are radial stators. The stators 36 in FIG. 35 can be radial since the nonrectangular nature of the blades 32 achieves the same benefits outlined above. That is, the nonrectangular stator blades 32 are designed and modulated so that no blade 32 crosses over a vane 36 at the same point as another blade 32 and no blade 32 ever overlaps a full stator vane 36 due to the different shape of the blades 32 relative to the vanes 36. The vanes 36 are labeled in FIG. 35 as $V1_R$-$V8_R$ (the subscript "R" identifying the vanes as radial). The substantially nonrectangular blades may be of various planform shapes, including scimitar planforms and tapered planforms. Also, the benefits identified above may be further achieved by using the substantially non-rectangular blade planforms and using unmodulated stator vanes that have a constant spacing where the vanes are either radial or nonradial.

In an embodiment of the invention, to reduce noise generated during operation of the counter-torque device 14, 214 a noise reducing structure 440 constructed according to an embodiment of the present invention is integrated into the duct 16, 216. The noise reducing structure 440 is structured to muffle, absorb, or alter the noise generated by the counter-torque device 14, 214 so as to reduce the overall noise level of the counter-torque device 14, 214. The noise reducing structure 440 may be integrated into any suitable ducted counter-torque device.

Figure 37:
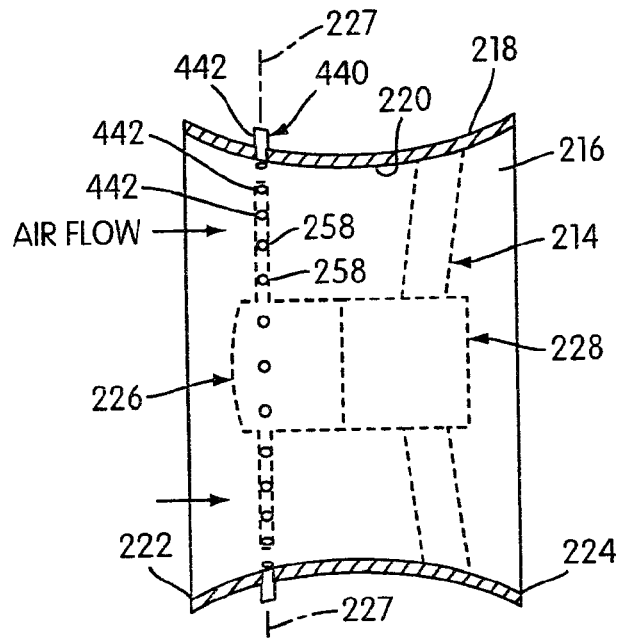
FIG. 37 is a partial cross-sectional view illustrating a noise reducing structure integrated into the counter-torque device shown in FIG. 1, the noise reducing structure constructed in accordance with an embodiment of the invention.
Figure 38:
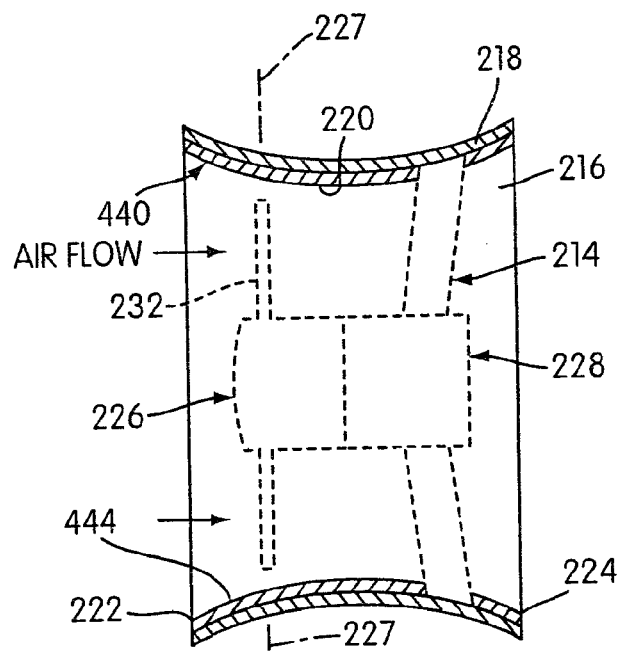
FIG. 38 is a partial cross-sectional view illustrating another embodiment of a noise reducing structure integrated into the counter-torque device shown in FIG. 1.
Figure 39:
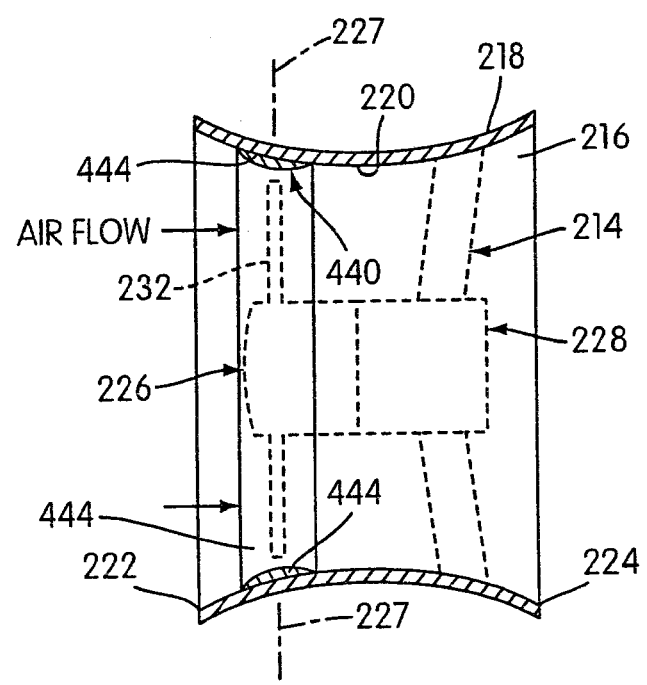
FIG. 39 is a partial cross-sectional view illustrating another embodiment of a noise reducing structure integrated into the counter-torque device shown in FIG. 1.
Figure 40:
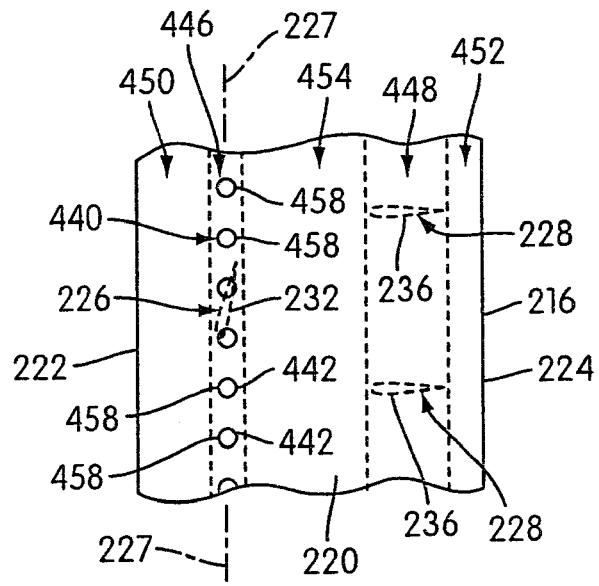
FIG. 40 is a top view illustrating the noise reducing structure shown in FIG. 37 integrated into the counter-torque device shown in FIG. 1.
Figure 41:
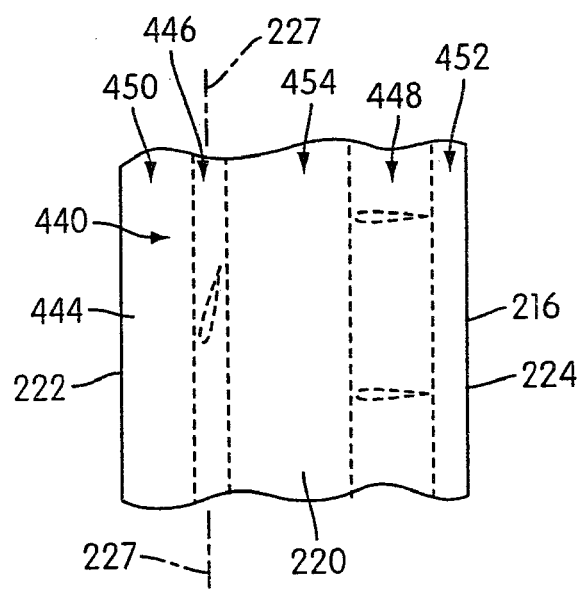
FIG. 41 is a top view illustrating the noise reducing structure shown in FIG. 38 integrated into the counter-torque device shown in FIG. 1.

FIGS. 37-43 illustrate various embodiments of the noise reducing structure 440. For example, the noise reducing structure 440 may be a plurality of noise reducing resonators 442 integrated into the shroud 218 surrounding the duct 216 (FIGS. 37, 40, 42, and 43), or the noise reducing structure 440 may be a noise reducing layer of material 444 that is attached to the duct surface 220 (FIGS. 38, 39, and 41). In general, the noise reducing structure 440 creates a surface within the duct 216 that reduces noise generated by operation of the counter-torque device 214.

The duct 216 as illustrated and for purposes of this application, can be divided into five regions, namely a rotor region 446 that extends within a plane of the rotor 226, a stator region 448 that extends within a plane of the stator 228, a leading edge region 450 that precedes the rotor region 446, a trailing edge region 452 that follows the stator region 448, and an intermediate region 454 that extends between the rotor region 446 and the stator region 448 (see FIGS. 40 and 41). In the illustrated embodiments of FIGS. 37-41, the noise reducing structure 440 is positioned within the duct 216 in at least the rotor region 446. That is, the noise reducing structure 440 is positioned within a plane of the rotor 226 as will be detailed below. In the figures, the plane of the rotor 226 is indicted by a line 227. However, it should be understood that the noise reducing structure 440 may also be positioned within any of the other regions, e.g., the intermediate region 454, the stator region 448, etc., either in combination with being positioned in the rotor region 446 or in combination with or without being in the rotor region 446.

Figure 42:
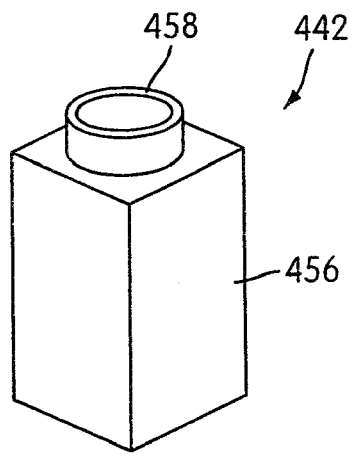
FIG. 42 is an isolated perspective view illustrating an embodiment of the noise reducing structure shown in FIG. 37.
Figure 43:
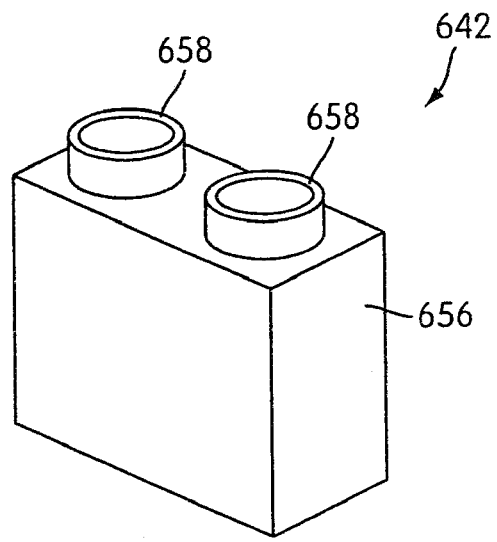
FIG. 43 is an isolated perspective view illustrating another embodiment of the noise reducing structure shown in FIG. 37.

FIGS. 37, 40, 42, 43 and 46 illustrate the noise reducing structure 440 in the form of a plurality of resonators 442. As shown in FIG. 42, each resonator 442, e.g., a Helmholtz resonator, can include a cavity 456 and an inlet opening 458 entering the cavity 456. However, each resonator 442 may have a plurality of inlet openings 458 entering the cavity 456. For example, FIG. 43 illustrates a resonator 642 including a cavity 656 and a pair of inlet openings 658 entering the cavity 656.

As best shown in FIG. 37, each of the plurality of resonators 442 is integrated into the shroud 218 surrounding the duct 216 such that the cavity 456 of each resonator 442 is positioned within the shroud 218 and the one or more inlet openings 458 of each resonator 442 are communicated with the duct surface 220 (constituted by either the wall of the shroud 218 or the stator support disk 238). Thus, the inlet openings 458 are flush with the surface of the shroud 218 forming the inner surface of the duct 218. In use, noise from the counter-torque device 214 enters the cavity 456 of each resonator 442 through the respective inlet opening(s) 458 and the cavity 456 muffles the noise to reduce the magnitude of the same. Thus, the plurality of resonators 442 cooperate to muffle the overall noise level of the counter-torque device 214.

An example of a prior art integrated resonator is disclosed in "Noise Reduction of Fenestrons Using Integrated Helmholtz Resonators" by Recker and Neuwerth and presented at the 24$^{th}$ European Rotorcraft Forum in Marseille, France on Sep. 15-17, 1998 (Reference AC10, pages 1-12), which is incorporated herein by reference thereto.

As illustrated in FIGS. 37 and 40, the plurality of resonators 442 are positioned within the shroud 218 such that one or more inlet openings 458 are positioned in the rotor region 446 of the duct 216. That is, one or more inlet openings 458 of the plurality of resonators 442 are positioned within the plane 227 of rotation of the rotor 226. As illustrated, the inlet openings 458 of the plurality of resonators 442 extend in spaced-apart relation in a ring-like configuration around the shroud 218. The inlet openings 458 are positioned such that a transverse plane that passes through at least a portion of the rotor hub 230 and the rotor blades 232 also passes through the inlet openings 458. However, it should be understood that one or more inlet openings 458 of the plurality of resonators 442 may also be positioned within any of the other duct regions, e.g., the intermediate region 454, the stator region 448, etc.

FIGS. 38, 39, 41, 44 and 45 illustrate the noise reducing structure 440 in the form of a noise reducing layer of material 444 that is attached to the duct surface 220 (constituted by either the wall of the shroud 218 or the stator support disk 238). The layer of material 444 may be one or more panels attached to the duct surface 220, or may be a coating that is applied to the duct surface 220. The layer of material 444 may be attached to the duct surface 220 in any suitable manner, e.g., soldered bond, adhesive, fasteners, etc. In use, the layer of material 444 creates a surface within the duct 216 that absorbs or alters the noise generated by operation of the counter-torque device 214.

For example, the noise reducing layer of material 444 may be constructed from a porous metallic material structured to absorb sound generated from operation of the counter-torque device 214. In one embodiment, the porous metallic material is Feltmetal®, which is an engineered, porous material made of sintered metal fibers. The Feltmetal® properties, e.g., fiber size, porosity, thickness, may be modified to control the desired sound absorption properties. However, any other suitable material may be utilized that would facilitate sound absorption.

Also, the noise reducing layer of material 444 may be constructed from an abrasive material structured to alter or muffle the sound generated from operation of the counter-torque device 414. Any suitable abrasive material may be utilized, and the abrasive material may be selected based on desired sound altering properties.

As shown in FIG. 41, the noise reducing layer of material 444 is attached to the duct surface 220 such that it is positioned in the rotor region 446 of the duct 216. That is, the layer of material 444 is positioned within the plane 227 of rotation of the rotor 226.

For example, FIG. 38 shows the layer of material 444 attached to the duct surface 220 such that it covers the entire duct surface 220 including the rotor region 446. However, the layer of material 444 may cover only a portion of the duct surface 220 that includes the rotor region 446. FIG. 39 illustrates the layer of material 444 attached to the duct surface 220 such that it extends in a ring-like configuration to cover the rotor region 446 of the duct 216. Thus, the layer of material 444 is positioned such that a transverse plane that passes through at least a portion of the rotor hub and the rotor blades also passes through the layer of material 444. As illustrated, the leading and trailing edges of the ring-like layer of material 444 are tapered so that the layer of material 444 does not significantly disturb the aerodynamics of the duct 216. However, it should be understood that the layer of material 444 may also be positioned within any of the other duct regions, e.g., the intermediate region 454, the stator region 448, etc.

Figure 44:
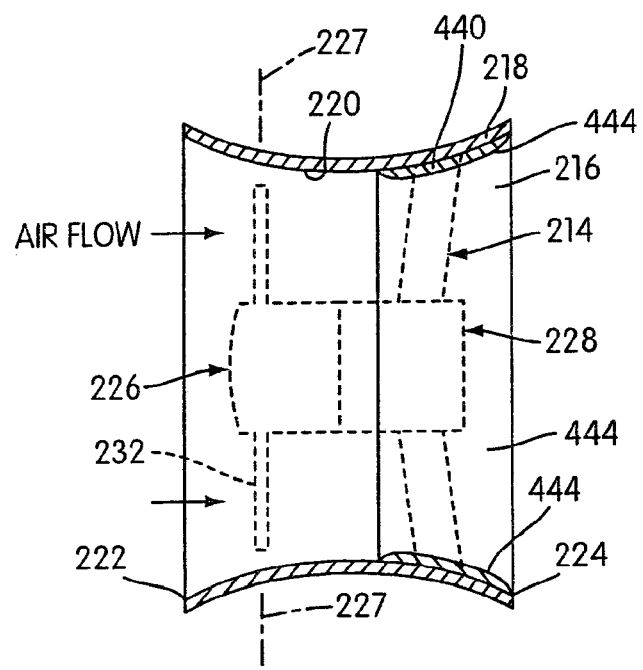
FIG. 44 shows another embodiment of the duct in accordance with the subject invention, with a portion of the duct at the stator including acoustic treatment.
Figure 45:
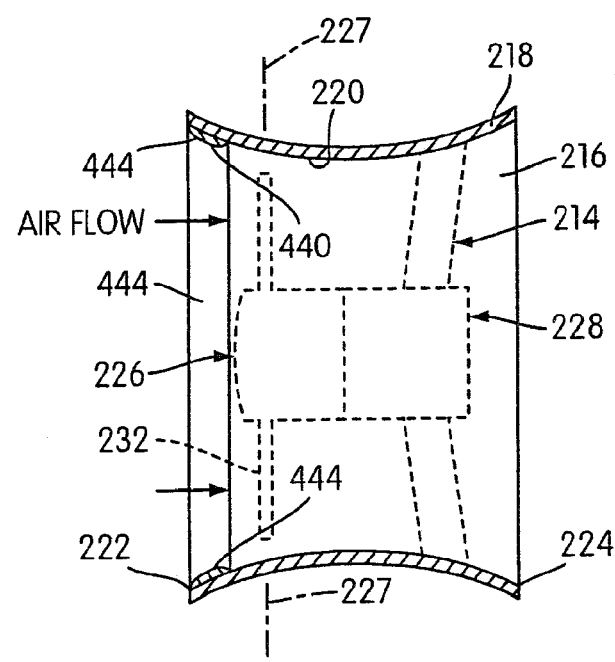
FIG. 45 shows another embodiment of the duct in accordance with the subject invention, with a portion of the duct at the leading edge including acoustic treatment.

As seen in FIG. 44, the layer of material 444 can be used, for example, just on the leading edge, before the rotor plane. As seen in FIG. 45, the layer of material 444 can be used, for example, just in the area of the stator 214. Thus, the noise reducing material disclosed in the subject application, including the use of resonators, acoustic material and abrasive material, is not limited to being used only in the plane of the rotor 226, or only in areas that include the plane of the rotor 226. As illustrated in FIGS. 44 and 45, the noise reducing material, especially the layer of material 444 can be used in areas off the plane of the rotor 226 such as at the trailing edge or at the area of the stator as generally illustrated in FIG. 44 and at the area of the leading edge as illustrated in FIG. 44.

Figure 46:
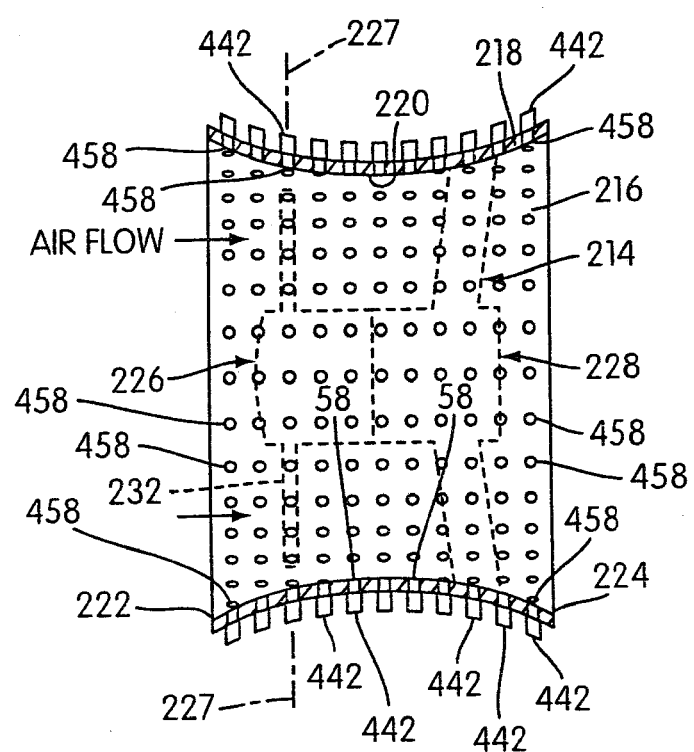
FIG. 46 shows another embodiment of the duct in accordance with the subject invention, with resonators being positioned in the plane of rotation of the rotor and at other positions along the length of the rotor.

As seen in FIG. 46, the resonators 442 can be employed not only in the plane 227 of the rotor 226 but can be employed at various positions along the length of the duct 218. As seen in FIG. 46, the resonators 442 are positioned along substantially the entire length of the duct 218 and substantially around the interior surface of the duct. However, it should be understood that the resonators can be selectively placed at various positions along the duct to optimize the noise reduction.

It should be understood that the noise reducing structures 440 illustrated are only exemplary, and the duct surface 220 may be acoustically treated in any suitable manner to reduce the sound generated by a ducted counter-torque device 214 of a helicopter. Moreover, the noise reducing structures 440 illustrated may be combined with one another to reduce the overall noise. For example, a noise reducing layer of material 444 may be utilized along with a plurality of resonators 442 to reduce the overall noise of the counter-torque device 214.

It should also be understood that although various embodiment have been disclosed herein as distinct methods and apparatus for decreasing noise, that any combination of the various embodiments may be employed as well. For example, the use of resonators or acoustic material in the rotor plane as illustrated in FIGS. 37 and 39, respectively, can be used together with an acoustic or abrasive material in the stator area as illustrated in FIG. 44 and/or an acoustic or abrasive material in the leading edge area as illustrated in FIG. 45.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A stator for a counter-torque device of a helicopter, said stator comprising:
    a hub; and
    a plurality of vanes distributed around said hub,
    wherein said vanes are angularly modulated around said hub such that the angular spacing between adjacent vanes of said vanes varies around said hub for each pair of said adjacent vanes,
    wherein said vanes are non-radial with respect to a center point of said hub such that each vane centerline passes through the hub and each vane centerline is tangent to a respective circle having a center positioned at the center point of the hub;
    wherein at least one of said vanes is modulated in a first direction such that said at least one of said vanes is slanted in said first direction, which is transverse to a central axis of said hub and the remaining ones of said vanes are modulated such that they are slanted in a second direction that is opposite to said first direction.

2. The stator according to claim 1, further comprising:
    an annular support disk, said vanes being mounted between said hub and said support disk.

3. The stator according to claim 1, wherein each of said vanes are configured to be in tension.

4. The stator according to claim 1, wherein each of said vanes are modulated a first direction such that each of said vanes are slanted in said first direction, which is transverse to a central axis of said hub.

5. A ducted fan for a helicopter, comprising:
    a transverse duct; and
    a counter-torque device supported within said duct, said counter-torque device including a rotor rotatably mounted within said duct and a stator fixedly mounted within said duct downstream from said rotor,
    wherein said rotor includes a hub and a plurality of blades distributed about said hub, said blades being angularly modulated about a center point of said hub, and
    said stator includes a hub and a plurality of vanes distributed around said hub, wherein said vanes are angularly modulated around said hub such that the angular spacing between adjacent vanes of said vanes varies around said hub for each pair of said adjacent vanes.

6. The ducted fan according to claim 5, further comprising an annular support disk that is mounted within said duct to support said plurality of vanes.

7. The ducted fan according to claim 5, wherein said blades are equal in number to said vanes.

8. The ducted fan according to claim 5, wherein each of said blades intersects a respective vane as viewed along the longitudinal axis of said duct at an intersection point, each of said intersection points for each of said respective blades and vanes having a different radial length from a center of said hub of said stator.

9. The ducted fan according to claim 8, wherein said intersection points cooperate to form a helix.

10. The ducted fan according to claim 5, wherein said vanes are in tension when said rotor is operated.

11. The ducted fan according to claim 5, wherein said vanes are non-radial with respect to a center point of said hub.

12. The ducted fan according to claim 5, wherein each of said vanes is modulated in a first direction such that each of said vanes are slanted in said first direction, which is transverse to a central axis of said hub.

13. The ducted fan according to claim 5, wherein one of said vanes is modulated in a first direction such that said one of said vanes are slanted in said first direction, which is transverse to a central axis of said hub and the remaining ones of said vanes are modulated such that they are slanted in a second direction that is opposite to said first direction.

14. The ducted fan according to claim 5, wherein said modulation of said vanes is configured and arranged relative to the distribution of blades of said rotor such that each of said blades intersects a respective vane, as viewed along the longitudinal axis of said duct, at a different radial distance from a center point of said hub.

* * * * *